US012742892B2

(12) United States Patent
Hsu et al.

(10) Patent No.: US 12,742,892 B2
(45) Date of Patent: Sep. 22, 2026

(54) 3D VISION AIDED GNSS REAL-TIME KINEMATIC POSITIONING FOR AUTONOMOUS SYSTEMS IN URBAN CANYONS

(71) Applicant: THE HONG KONG POLYTECHNIC UNIVERSITY, Hong Kong (CN)

(72) Inventors: Li-Ta Hsu, Hong Kong (CN); Weisong Wen, Hong Kong (CN)

(73) Assignee: The Hong Kong Polytechnic University, Hong Kong (CN)

( * ) Notice: Subject to any disclaimer, the term of this patent is extended or adjusted under 35 U.S.C. 154(b) by 197 days.

(21) Appl. No.: 18/856,932

(22) PCT Filed: Apr. 12, 2023

(86) PCT No.: PCT/CN2023/087717
§ 371 (c)(1),
(2) Date: Oct. 15, 2024

(87) PCT Pub. No.: WO2023/198090
PCT Pub. Date: Oct. 19, 2023

(65) Prior Publication Data

US 2025/0258304 A1 Aug. 14, 2025

Related U.S. Application Data

(60) Provisional application No. 63/362,982, filed on Apr. 14, 2022.

(51) Int. Cl.
*G01S 19/47* (2010.01)
*G01S 19/44* (2010.01)

(52) U.S. Cl.
CPC ............. *G01S 19/47* (2013.01); *G01S 19/44* (2013.01)

(58) Field of Classification Search
None
See application file for complete search history.

(56) References Cited

U.S. PATENT DOCUMENTS 9,298,992 B2 * 3/2016 Harada .................. G06V 20/56
11,847,802 B2 * 12/2023 Chawla .................. G06V 20/20
(Continued)

OTHER PUBLICATIONS

Yu, Xudong. “Research on Localization Method of Unmanned Vehicle Based on Multi-Source Information Fusion” Chinese Master’s Theses Full-text Database Engineering Science and Technology II, No. 1, Jan. 15, 2021 (Jan. 15, 2021), ISSN: 1674-0246 (relevant pp. 16-18,34-35,37-39).

*Primary Examiner* — Bernarr E Gregory
(74) *Attorney, Agent, or Firm* — S&F/WEHRW

(57) ABSTRACT

In estimating a position of a vehicle utilizing a global navigation satellite system (GNSS), it is desirable to exclude outliner GNSS measurements due to navigation signals via non-light-of-sight paths from the GNSS to the vehicle, but it leads to a distorted satellite geometry distribution. Complementariness between low-lying visual landmarks and healthy but high-elevation satellite measurements is explored to improve the geometry constraint. Measurements of an inertial measurement unit, low-lying visual landmarks captured by a forward-looking camera onboard the vehicle, and healthy but high-elevation satellite measurements are tightly-coupled integrated via sliding window optimization of system states used in a factor graph. To improve estimation performance, good initial guesses of system states are important. As such, initial guesses of velocity set and position set inside a sliding window are estimated simultaneously based on data of Doppler measurement, double-differenced (DD) pseudorange measurement and DD carrier-phase measurement as obtained in GNSS measurements.

15 Claims, 13 Drawing Sheets

(56) References Cited

U.S. PATENT DOCUMENTS

| | | | | |
|---|---|---|---|---|
| 2008/0040029 | A1* | 2/2008 | Breed | G01S 19/42 701/514 |
| 2008/0166011 | A1* | 7/2008 | Sever | G01S 19/28 382/100 |
| 2012/0293365 | A1* | 11/2012 | Ashjaee | G01S 19/485 342/357.25 |
| 2018/0024250 | A1* | 1/2018 | Nishi | G01S 19/23 342/357.62 |
| 2018/0373264 | A1* | 12/2018 | Madsen | G01S 19/45 |
| 2019/0114507 | A1 | 4/2019 | Chiu et al. | |
| 2021/0372796 | A1* | 12/2021 | Lin | G01C 21/20 |
| 2022/0357751 | A1* | 11/2022 | Thomson | G01C 21/20 |

* cited by examiner

3D VISION AIDED GNSS REAL-TIME KINEMATIC POSITIONING FOR AUTONOMOUS SYSTEMS IN URBAN CANYONS

CROSS-REFERENCE TO RELATED APPLICATIONS

This application claims priority to, and the benefit of, U.S. Provisional Patent Application Ser. No. 63/362,982 filed Apr. 14, 2022, the disclosure of which is incorporated by reference herein in its entirety.

| ABBREVIATIONS | |
|---|---|
| 2D | two-dimensional |
| 3D | three-dimensional |
| ADOP | ambiguity dilution of precision |
| DD | double-differenced |
| DNN | deep neural network |
| DOP | dilution of precision |
| ECDF | error cumulated distribution function |
| ECEF | Earth-centered, earth-fixed |
| ENU | East, north, and up |
| EKF | extended Kalman filter |
| FGO | factor graph optimization |
| FOV | field of view |
| GNSS | global navigation satellite system |
| IMU | inertial measurement unit |
| LiDAR | light detection and ranging |
| LOAM | LiDAR odometry and mapping |
| LOS | line-of-sight |
| NE | NLOS exclusion |
| NLOS | non-line-of-sight |
| RTK | real-time kinematic |
| SLAM | simultaneous localization and mapping |
| SPP | single point positioning |
| VDOP | vertical dilution of precision |
| VI | visual/inertial |
| VINS | visual/inertial system |
| WLS | weighted least squares |

TECHNICAL FIELD

The present disclosure relates to a 3D vision aided GNSS-RTK positioning method that can achieve high precision in position estimation in highly dense urbanized areas.

BACKGROUND

Accurate, globally referenced positioning is one of the crucial components for autonomous systems, such as autonomous driving, unmanned aerial vehicles, and unmanned ground vehicles. In the past several decades, there have been extensive explorations on these approaches that use onboard local sensors, such as cameras, IMUs, or LiDAR. The LiDAR-based SLAM has attracted much attention due to its superior robustness and accuracy, such as the LOAM pipeline, the variants of LOAM, and its integration with IMU to enhance the robustness in challenging environments. However, the high cost of the 3D LiDAR sensor is one of the major problems preventing its massive deployment in autonomous systems. Moreover, the LiDAR odometry-based positioning is subjected to inevitable drift in long-term operation, even with the assistance of IMU. Different from the LiDAR-based positioning solutions, the VINS opens another window for robotics navigation owing to their distinct complementariness and cost-effectiveness. The VINS is characterized by such advantages in size, power assumption, weight, and availability. Many state-of-the-art VINS pipelines have been developed in the past several decades, such as the filtering-based methods including MSCKF, ROVIO, and Openvins. The other research stream is the optimization-based VINS pipelines, including the OKVIS, VINS-Mono, and ORB-SLAM3. However, the VINS shares a similar drawback with the LiDAR, namely that the state estimation is subject to drift over time. Moreover, according to previous studies, the urban canyon scenarios introduce additional challenges to the VINS due to excessive moving objects from surroundings, unstable illumination conditions, and even stronger motion blur, which would induce enhanced drift. To mitigate the overall drift, there are some studies proposing to integrate the globally referenced GNSS SPP with VINS through a loosely coupled manner or even a tightly coupled manner. As a result, the absolute positioning accuracy depends highly on the GNSS solution. Unfortunately, the accuracy arising from the GNSS based on a single receiver is limited due to the atmosphere and receiver clock errors. According to the evaluated urban-Loco datasets in a study, and an overall absolute mean error of 4.5 meters is obtained via tightly coupled integration of visual/inertial/GNSS in urban scenarios, which cannot satisfy the navigation requirement of a typical autonomous system.

Fortunately, the GNSS-RTK introduces a significantly higher level of absolute positioning accuracy with the assistance of the carrier-phase measurements and corrections from the reference station. Therefore, the combination of the VINS and GNSS-RTK is a promising solution to achieve globally referenced and locally accurate positioning. Typically, the GNSS-RTK positioning involves two steps: (1) the float solution is estimated based on the DD GNSS carrier-phase and pseudorange measurements; (2) the integer ambiguity is subsequently resolved through integer least-squares algorithms (e.g., LAMBDA) based on the derived float solution. Centimeter-level positioning accuracy can be achieved in an open area when the fixed solution is achieved. Unfortunately, the accuracy of GNSS-RTK is significantly degraded in urban canyons due to the NLOS receptions caused by GNSS signal reflection and blockage from surrounding buildings and even dynamic objects, such as double-decker buses. Theoretically, the significantly degraded GNSS-RTK positioning accuracy in urban canyons is induced by two major problems.

Problem 1: According to our previous findings, the majority of the received GNSS signals can be NLOS receptions in highly urbanized areas. If the direct LOS signal transmission is blocked, and reflected signals from the same satellite are received, the notorious NLOS receptions would occur. Therefore, the accuracy of the float solution estimation based on the DD carrier-phase and pseudorange measurements is severely degraded.

Problem 2: The available satellite numbers are limited in urban canyons due to the signal blockage caused by surrounding buildings. Therefore, the geometry of the satellite distribution is distorted, which would cause a large ADOP. As a result, it is difficult to obtain a fixed solution due to the poorer satellite geometry with larger ambiguity searching space. Briefly, the poor GNSS measurement quality and satellite geometry distributions are the major problems limiting the performance of the GNSS-RTK.

Numerous scientific endeavors have been conducted in an attempt to remove these two bottlenecks. A method has been proposed in a study to integrate a high-cost IMU with GNSS-RTK to enhance the robustness against the GNSS outlier measurements (e.g. NLOS receptions). Meanwhile, the potential GNSS NLOS measurements are also partially excluded based on a GNSS measurement residual-based consistency check. However, such enhancement is limited by the cost of the employed IMU sensor and the incidence of the GNSS outlier measurements. The similar work went one step further by integrating the GNSS-RTK/visual/inertial based on an EKF estimator together with a similar outlier rejection scheme based on residual. However, the GNSS NLOS exclusion can only partially exclude the GNSS NLOS receptions and can even aggravate the problem of degraded satellite geometry distribution. Considering that the GNSS measurements are highly environmentally dependent and time-correlated, instead of using a filtering-based estimator, a FGO-based GNSS-RTK positioning method was proposed in our recent work. This method enabled the exploration of the time correlation between multiple epoch measurements simultaneously to enhance the robustness against the GNSS outlier measurements. However, its performance depended on the incidence of the GNSS outlier measurements involved in the factor graph. Besides, multiple antennas were employed to enhance the robustness of GNSS-RTK against the outlier measurements. However, the method relied on expensive geodetic antennas. In a recent study, the GNSS-RTK in urban canyons was improved by excluding polluted GNSS signals with the assistance of 3D building models and pre-defined initial guess of the GNSS receiver's position. The increased fixed rate was obtained after selecting the healthy LOS measurements. In a recent study, multiple hypotheses-based 3D building models that aid GNSS-RTK in positioning were proposed, and improved accuracy in geodetic level GNSS receiver can be obtained. However, the NLOS satellite exclusion relies on the availability of accurate 3D building models and the good initial guess of the GNSS receiver's position which is usually hard be obtained in urban canyons.

On the ground that the performance of GNSS positioning is directly influenced by real-time surrounding environmental features, such as buildings and dynamic objects, the other popular research stream is to employ the onboard sensor to reconstruct or sense the surroundings to further identify the potential NLOS receptions. Our previous works proposed to continuously improve the GNSS positioning in urban canyons using onboard 3D LiDAR sensors by excluding or even correcting the potential NLOS measurements. However, the performance of NLOS detection based on these methods was limited by the FOV of the applied 3D LiDAR sensor. Moreover, the 3D LiDAR was still too expensive for the low-cost autonomous system application. Instead of relying on the expensive 3D LiDAR sensor, our previous work, e.g., [2], proposed to detect the GNSS NLOS using a sky-pointing fish-eye camera in dense urban canyons, and improved GNSS SPP is obtained. These methods contributed to alleviating the adverse impacts of GNSS NLOS receptions, which would improve the GNS-RTK in urban canyons. However, this can cause the second problem of GNSS-RTK, namely that the satellite geometry distributions can be significantly degraded due to the exclusion of NLOS satellites with low elevation angles. In other words, only the satellites with high elevation angles can survive from the NLOS exclusion.

In view of shortcomings of existing GNSS-based positioning techniques as discussed above, there is a need in the art for an improved positioning technique that achieves a good positioning accuracy in urban canyon scenarios without using a 3D LiDAR sensor for cost saving. The improved technique is required to address Problems 1 and 2 as mentioned above.

SUMMARY

An aspect of the present disclosure is to provide a method for estimating a position of a vehicle. The vehicle is configured to receive navigation signals of a GNSS.

The method comprises: obtaining a first set of GNSS data derived from a first plurality of navigation signals received by the vehicle for positional measurement, wherein the first plurality of navigation signals excludes any navigation signal identified to travel from the GNSS to the vehicle via a NLOS path, allowing the first set of GNSS data to be obtained from healthy but high-elevation satellite measurements; obtaining a second set of GNSS data derived from a second plurality of navigation signals received by a reference station for providing RTK positioning in vehicle-position estimation; generating a plurality of GNSS factors indicative of a contribution of GNSS measurement to vehicle-position estimation according to the first and second sets of GNSS data; identifying a set of low-lying visual landmarks from a first set of images that capture low-lying environment structures visible to the vehicle for visually measuring a near-ground environment; generating a visual factor indicative of a contribution of visual measurement to vehicle-position estimation according to the set of low-lying visual landmarks; optimizing a plurality of system states used in a factor graph for integrating measurement data obtained in plural measurements to yield a float solution of the vehicle position, the factor graph being formed by a plurality of factors, an individual factor being indicative of a contribution of a measurement to vehicle-position estimation, wherein the plurality of factors includes the visual factor and the plurality of GNSS factors, thereby utilizing complementariness between the set of low-lying visual landmarks and the first plurality of navigation signals for improving geometry constraints in vehicle-position estimation to enhance estimation accuracy; and resolving integer ambiguity of the float solution to yield an estimated position of the vehicle.

In certain embodiments, the identifying of the set of low-lying visual landmarks comprises: detecting a set of visual features from the first set of images; and tracking an individual visual feature over time according to the first set of images to determine whether the individual visual feature is a low-lying visual landmark, thereby allowing the set of low-lying visual landmarks to be identified.

In certain embodiments, the identifying of the set of low-lying visual landmarks further comprises using a forward-looking camera onboard the vehicle to generate the first set of images.

In certain embodiments, the method further comprises: measuring a set of motion parameters of the vehicle by an IMU onboard the vehicle; and generating an IMU factor indicative of a contribution of IMU measurement to vehicle-position estimation according to the set of motion parameters; wherein in integrating the measurement data obtained in the plural measurements, the plurality of factors further includes the IMU factor.

In certain embodiments, the generating of the IMU factor comprises: generating an IMU pre-integration factor from the set of motion parameters; and mapping the IMU pre-integration factor to a local world frame to thereby generate the IMU factor, wherein the local world frame is a reference frame of a visual/inertial system in the vehicle.

In certain embodiments, the optimizing of the plurality of system states comprises generating initial guesses for respective system states.

In certain embodiments, the generating of the initial guesses for the respective system states includes: a VI initialization step of generating initial guesses for VI-related system states; and a GNSS-VI initialization step of generating initial guesses for GNSS-related system states; wherein in the plurality of system states, initial guesses of velocity set and position set inside a sliding window are estimated simultaneously based on data of Doppler measurement, DD pseudorange measurement and DD carrier-phase measurement as computed from the first and second sets of GNSS data.

In certain embodiments, the plurality of system states includes: position, orientation and velocity of the IMU; biases of gyroscope and accelerometer in the IMU; an inverse depth of an individual visual landmark; a receiver clock bias drift rate; and extrinsic parameters between a global frame used by the GNSS, and a local world frame used by a visual/inertial system in the vehicle.

In certain embodiments, the optimizing of the plurality of system states comprises generating initial guesses for respective system states.

In certain embodiments, the generating of the initial guesses for the respective system states includes: a VI initialization step of generating initial guesses for VI-related system states; and a GNSS-VI initialization step of generating initial guesses for GNSS-related system states; wherein in the plurality of system states, initial guesses of velocity set and position set inside a sliding window are estimated simultaneously based on data of Doppler measurement, DD pseudorange measurement and DD carrier-phase measurement as computed from the first and second sets of GNSS data.

In certain embodiments, the VI-related system states include: position, orientation and velocity of the IMU; biases of gyroscope and accelerometer in the IMU; and an inverse depth of an individual visual landmark. The GNSS-related system states include: a receiver clock bias drift rate; and extrinsic parameters between a global frame used by the GNSS, and a local world frame used by a visual/inertial system in the vehicle.

In certain embodiments, the plurality of GNSS factors includes a DD pseudorange factor, a DD carrier-phase factor, and a GNSS Doppler factor.

In certain embodiments, the obtaining of the first set of GNSS data comprises: using a sky-pointing fish-eye camera onboard the vehicle to generate a second set of images that capture sky views; determining a boundary of an open sky above the vehicle from the second set of images; comparing the boundary of the open sky with locations of different satellites in the GNSS to identify a plurality of satellites invisible to the vehicle; deriving a third set of GNSS data from a third plurality of navigation signals receivable by the vehicle; and forming the first set of GNSS data from the third set of GNSS data by excluding GNSS data derived from any navigation signal originated from an invisible satellite identified in the plurality of invisible satellites.

In certain embodiments, the boundary of the open sky above the vehicle is determined by using a DNN to perform image segmentation and classification on the second set of images.

In certain embodiments, the DNN is a U-net.

Other aspects of the present disclosure are disclosed as illustrated by the embodiments hereinafter.

Skilled artisans will appreciate that elements in the figures are illustrated for simplicity and clarity and have not necessarily been depicted to scale.

DETAILED DESCRIPTION

Disclosed herein is a method for estimating a position of a vehicle using a GNSS. Before the disclosed method is detailed, the rationale adopted in developing the disclosed method is first illustrated.

Figure 1:
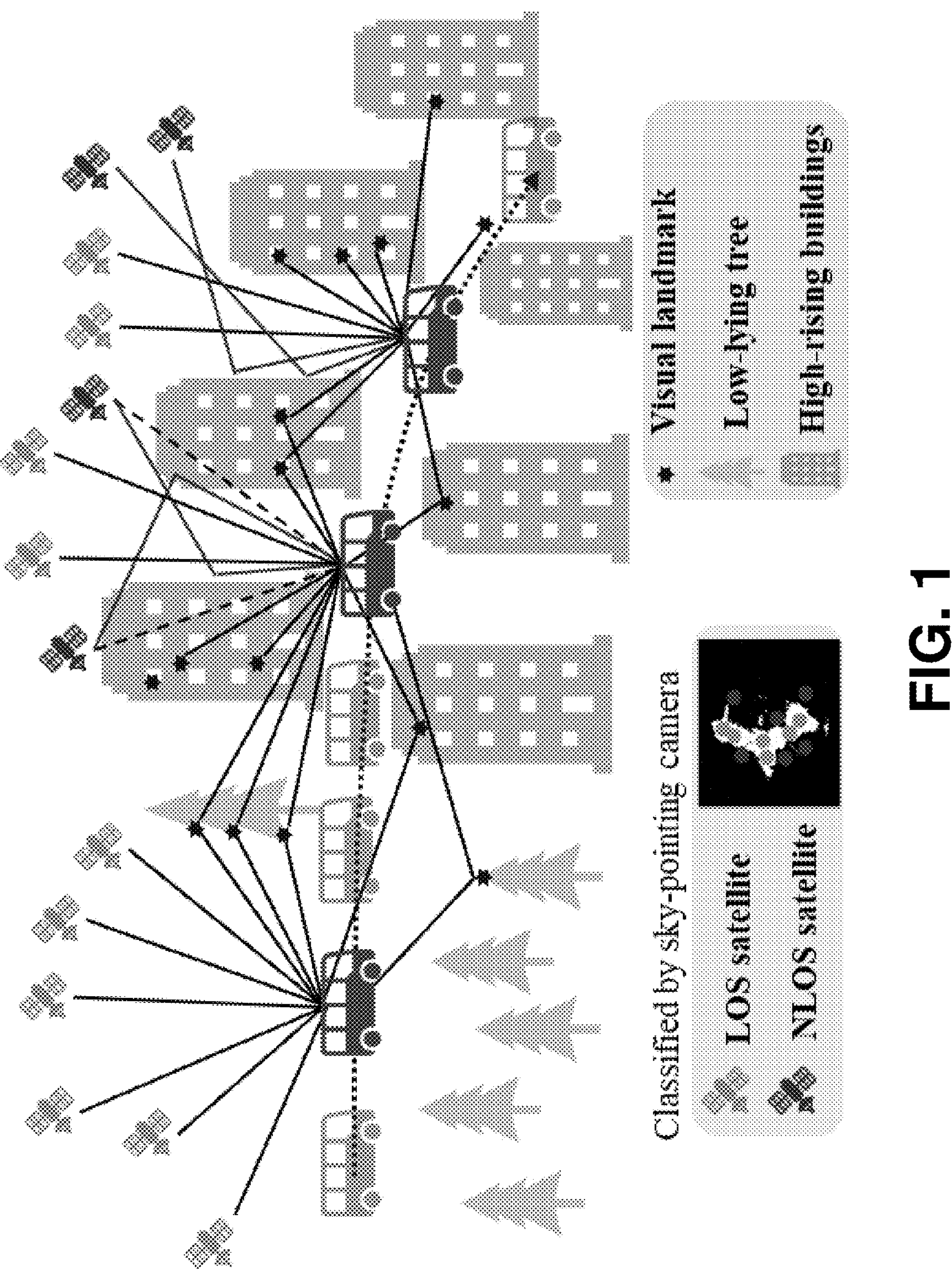
FIG. 1 is a demonstration of the strong complementariness between the low-lying visual landmarks and the healthy but high-elevation satellite measurements.

As mentioned above, only the satellites with high elevation angles in the GNSS can survive from NLOS exclusion. Contrary to the GNSS, the visual features from a forward-looking camera are mainly detected from the low-lying environment structures with low elevation angles connecting the vehicle, for example, the trees, roadside pillars, and poles. Inspired by this astonishing complementariness between the low-lying visual landmarks and the healthy but high-elevation satellite measurements, we propose employing the 3D vision to assist the GNSS-RTK in urban canyons. A demonstration of the complementariness is shown in FIG. 1. To the best of the inventors' knowledge, this is the first effort to solve the major problem of GNSS-RTK for the positioning of autonomous systems by deeply exploring the complementariness between the GNSS satellite measurements and the visual landmark measurements in urban canyons. The key technical advancement provided by the present disclosure is listed as follows.

First, tackle the problem of poor geometry after excluding GNSS NLOS receptions by employing the low-lying visual landmarks to improve the geometry constraint of GNSS-RTK. To achieve this, a tightly coupled fusion estimator was proposed by integrating the measurements from IMU pre-integration, low-lying visual landmarks reprojection, healthy but high elevation GNSS double-differenced pseudorange, and carrier-phase measurements together with the Doppler frequency measurements through a factor graph-based sliding window optimization, which enables the exploration of the time-correlation of GNSS measurements between multiple epochs. With the assistance of the constraint from the low-lying visual landmarks, the ADOP was significantly decreased (better geometry constraints for GNSS-RTK). Subsequently, the estimated state of the system was employed as the float solution of the ambiguity resolution of GNSS-RTK, which could achieve a fixed solution. It is notable that the integration of the visual measurements also contributes to obtaining a more accurate float position estimation that is also significant for achieving a fixed solution.

Second, the proposed estimator involves multiple data sources with different observation models, which could induce additional non-linearity. As a result, the performance of the estimator relies heavily on the initial guess of the system state. Thus, a carrier-phase ambiguity-free algorithm was proposed to carefully initialize the extrinsic parameters between the VINS local frame and the GNSS global frame, and the integer ambiguity of the DD carrier-phase measurements.

Third, verify the proposed method through several challenging datasets collected in urban canyons of Hong Kong through low-cost automobile level GNSS receivers together with automobile visual/inertial sensor suit.

The disclosed method is described as follows. Section A provides an overview of the disclosed method. GNSS measurements modeling is elaborated in Section B. The tightly-coupled integration of GNSS-RTK/visual/inertial, which forms a core part of the disclosed method, is presented in Section C, followed by an interpretation of the system initialization in Section D. Moreover, several real experiments conducted to evaluate the effectiveness of the disclosed method are reported in Section E. Embodiments of the present disclosure are developed in Section F based on the developments in Sections A-E.

A. System Overview and Notations

A.1. System Overview

Figure 2:
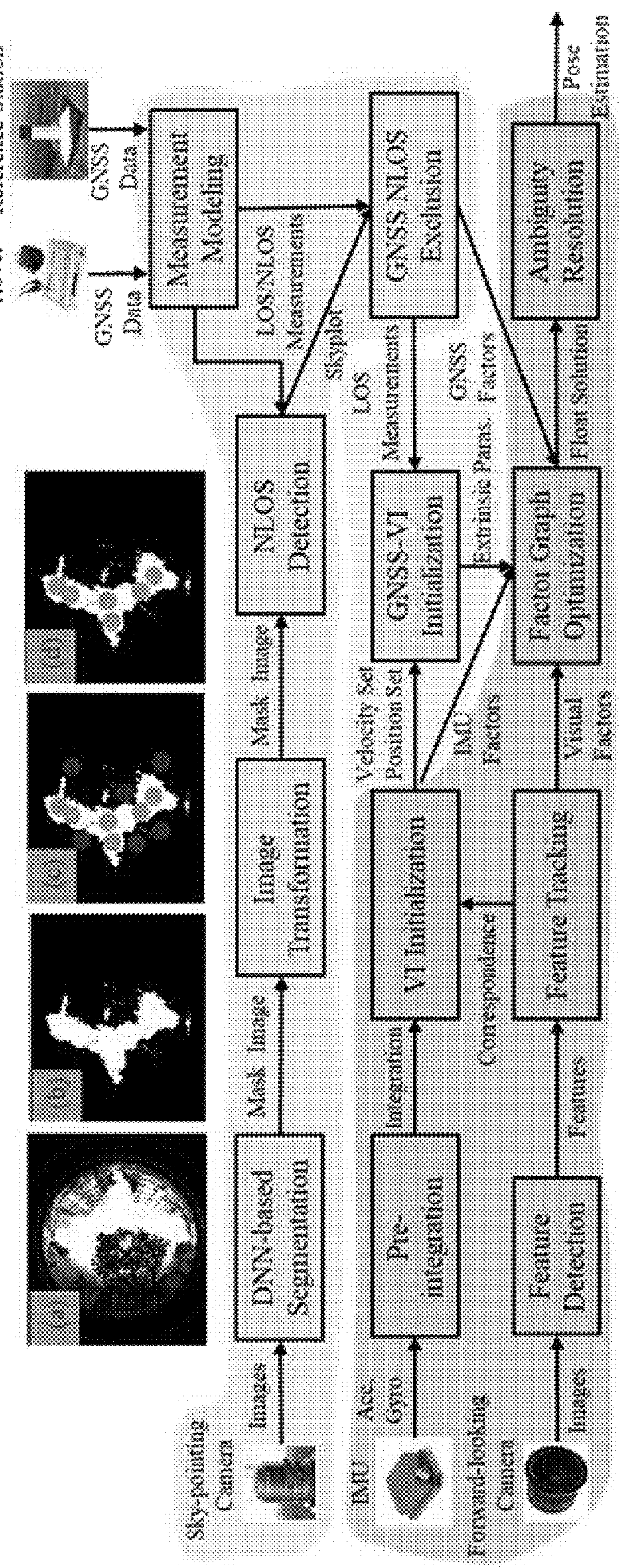
FIG. 2 is an overview of the proposed method. The DD denotes the double-difference technique in GNSS-RTK. The DNN and VI denote deep neural networks and visual/inertial, respectively. The “Acc” and “Gyro” denote the accelerometer and gyroscope measurements, respectively.

An overview of the proposed method is shown in FIG. 2. The system consists of two parts.

Outlier (GNSS NLOS) removal. The real-time environment understanding is aided by a sky-pointing fish-eye camera. The captured images are used in GNSS NLOS exclusion. The outcomes of this part include satellite visibility, LOS, or NLOS receptions. This is based on our previous work [2] but improved by using a U-net to segment the sky area from the non-sky one. An illustration of the sky-view image is shown in FIG. 2(*a*), where the sky view includes the building roofs and trees, even the roof of the surrounding moving vehicles. The segmented sky view image is shown in FIG. 2(*b*) using the U-net where the white and black pixels denote the sky and non-sky areas, respectively. Subsequently, the satellites can be projected to the segmented image, based on the satellite elevation, azimuth angles, and the heading (provided by the high-frequency pose estimation from IMU to be presented later) of the sky-pointing camera concerning the north of the earth. Then, those GNSS NLOS measurements can be detected (refer to FIG. 2(*c*)) and only the healthy LOS measurements are utilized (refer to FIG. 2(*d*)). The detail of the GNSS NLOS detection via the sky-pointing camera can be found in our prior work [2].

Improve the geometry with visual landmark measurements. The tightly coupled fusion estimator integrates the measurements from IMU pre-integration, low-lying visual landmarks reprojection from the forward-looking camera, healthy (high elevation angle) GNSS LOS measurements through a factor graph-based sliding window optimization. The outcome of this part includes the improved pose estimation of the system. A conceptual illustration of the proposed geometry improvement is shown in FIG. 1. When the vehicle starts from the left side of FIG. 1 that denotes an open-sky and GNSS-friendly scenario, all the GNSS measurements are LOS and a fixed solution can be obtained by GNSS-RTK with centimeter-level accuracy. The surrounding is mainly composed of low-lying trees which can also provide low-lying visual features to further smooth the state estimation. When the vehicle gets into the right side of FIG. 1 that denotes a GNSS-challenging urban canyon scenario, the GNSS NLOS receptions would occur (refer to the red satellite icon in FIG. 1). Fortunately, the low-lying visual landmarks and the remaining but limited LOS satellites (refer to the satellite icon in FIG. 1) are highly complementary, which is the main inspiration of this study.

A.2. Frame Definitions

Since multiple data sources are from different spatial frames, it is important to define associated coordinates. The following frames are used herein.

ECEF frame. It refers to a global frame typically used to define the position of the satellites and associated measurements. $(\bullet)^{WE}$ is adopted to denote the variable represented in the ECEF frame.

ENU frame. It refers to the other commonly used global frame of GNSS with the x, y and z axis of ENU frame pointing to the east, north and up directions, respectively. $(\bullet)^{WG}$ is adopted to denote the variable represented in the ENU frame.

Local world frame. It refers to a local world frame of pose estimation from local sensors (such as visual and inertial), which is the reference frame of the VINS in the present disclosure. $(\bullet)^{WL}$ is adopted to denote the variable represented in the local world frame.

Sensor frames. The sensor frame is fixed on the sensor body. In the present disclosure, sensor frames include the IMU frame, camera frame, and GNSS receiver frame, which are denoted by $(\bullet)^b$, $(\bullet)^c$ and $(\bullet)^r$, respectively. Similar to the work in VINS-Mono [1], the IMU frame is selected as the target frame of state estimation in the present disclosure.

A.3. Notations

In the present disclosure, matrices are denoted as uppercase with bold letters. Vectors are denoted as lowercase with bold letters. Variable scalars are denoted as italic letters. Constant scalars are denoted as lowercase letters. To make the proposed pipeline clear, major notations described in the following paragraphs are used.

The pseudorange measurement received from a satellite s at a given GNSS epoch $r_t$ is expressed as $$\rho_{r_t}^s.$$

The subscripts r and t denote the GNSS receiver and the time index, respectively. The superscript s denotes the index of the satellite at the given epoch $r_t$.

The Doppler measurement received from satellite s at a given epoch $r_t$ is expressed as $$d_{r_t}^s.$$

The carrier-phase measurement received from a satellite s at a given epoch $r_t$ is expressed as $$\psi_{r_t}^s.$$

Let $$R_A^B$$

denote the rotation matrix that rotates a vector in frame {A} to frame {B}, and the $$q_A^B$$

is its quaternion form. A similar definition is applied to the definition of translation, e.g.

$$p_A^B$$

denotes the translation from the frame {A} to frame {B}. The transformation between both frames is expressed as $$T_A^B = [R_A^B, p_A^B].$$

The position of the satellite s at a given epoch $r_t$ is expressed as $$p_{r_t}^{WE,s} = (p_{r_t,x}^{WE,s}, p_{r_t,y}^{WE,s}, p_{r_t,z}^{WE,s})^T.$$

The "T" denotes the transpose operator.

The velocity of the satellite s at a given epoch $r_t$ is expressed as $$v_{r_t}^{WE,s} = (v_{r_t,x}^{WE,s}, v_{r_t,y}^{WE,s}, v_{r_t,z}^{WE,s})^T.$$

The position of the GNSS receiver at a given epoch r is expressed as $$p_{r_t}^{WE} = (p_{r_t,x}^{WE}, p_{r_t,y}^{WE}, p_{r_t,z}^{WE})^T.$$

The velocity of the GNSS receiver at a given epoch $r_t$ is expressed as $$v_{r_t}^{WE} = (v_{r_t,x}^{WE}, v_{r_t,y}^{WE}, v_{r_t,z}^{WE})^T.$$

The clock bias of the GNSS receiver at a given epoch $r_t$ is expressed as $$\delta_{r_t}^{r,j},$$

with the unit in meters. The variable j denotes the associated satellite systems, such as GPS and BeiDou satellite systems. The receiver clock bias drift is expressed as $$\dot{\delta}_{r_t}^r.$$

Note that all the satellite systems share the same clock bias drift.

The clock bias of satellite s at epoch $r_t$ is expressed as $$\delta_{r_t}^s.$$

The satellite clock bias is expressed as $$\dot{\delta}_{r_t}^s.$$

The position of the base (reference) station is expressed as $p_e=(p_{e,x}, p_{e,y}, p_{e,z})^T$. The variables $$\rho_{e,r_t}^s$$

and $$\psi_{e,r_t}^s$$

denote the pseudorange and range measurements of carrier-phase from satellite s received by the reference station at epoch $r_t$. The subscript "e" denotes the reference station.

The extrinsic parameter between the camera and IMU sensor frame is expressed as $$T_c^b = [R_c^b, p_c^b].$$

The extrinsic parameter between the GNSS receiver and IMU sensor frame is expressed as $$p_r^b.$$

B. GNSS Measurements Modeling

In this section, the modeling of the GNSS measurements is described, including the DD pseudorange and carrier-phase measurements together with the Doppler measurements.

B.1. DD Pseudorange/Carrier-Phase Measurements Modeling

In terms of the measurements from the GNSS receiver, each pseudorange measurement $$\rho_{r_t}^s,$$

can be expressed as follows.

$$\rho_{r_t}^s = r_{r_t}^s + c\left(\delta_{r_t}^{r,j} - \delta_{r_t}^s\right) + I_{r_t}^s + T_{r_t}^s + \varepsilon_{r_t}^s \tag{1}$$

where $$r_{r_t}^s$$

represents the geometric range between the satellite and the GNSS receiver;

$$I_{r_t}^s$$

denotes the ionospheric delay distance;

$$T_{r_t}^s$$

represents the tropospheric delay distance; and $$\varepsilon_{r_t}^s$$

represents the errors caused by the multipath effects, NLOS receptions, receiver noise, and antenna phase-related noise. Due to the potential clock-related and atmosphere-related errors involved in the raw pseudorange measurements, the accuracy of the conventional pseudorange based SPP is limited to several meters.

Similarly, the carrier-phase measurement, $$\psi_{r_t}^s,$$

is expressed as $$\lambda_j \psi_{r_t}^s = r_{r_t}^s + c_L\left(\delta_{r_t}^{r,j} - \delta_{r_t}^s\right) - I_{r_t}^s + T_{r_t}^s + \lambda B_{r_t}^s + d\psi_{r_t}^s + \epsilon_{r_t}^s \tag{2}$$

with $$B_{r_t}^s = \psi_{r_t,0} - \psi_{0,r_t}^s + N_{r_t}^s$$

where $$B_{r_t}^s$$

refers to the carrier-phase bias. The variable $\lambda_j$ represents the carrier wavelength of satellite system j. The variable $$d\psi_{r_t}^s$$

represents the carrier-phase correction terms, including antenna phase offsets and variations, station displacement by earth tides, phase windup effect, and relativity correction on the satellite clock. The detailed formulation of the carrier-phase correction can be found. The variable $\psi_{r,0}$ represents the initial phase of the receiver local oscillator. Similarly, $$\psi_{0,r_t}^s$$

is the initial phase of the transmitted navigation signal from the satellite. The variable $$N_{r_t}^s$$

represents the carrier-phase integer ambiguity which is expected to an integer value.

$$\epsilon_{r_t}^s$$

is the errors caused by the multipath effects, NLOS receptions, receiver noise, and antenna delay.

Figure 3:
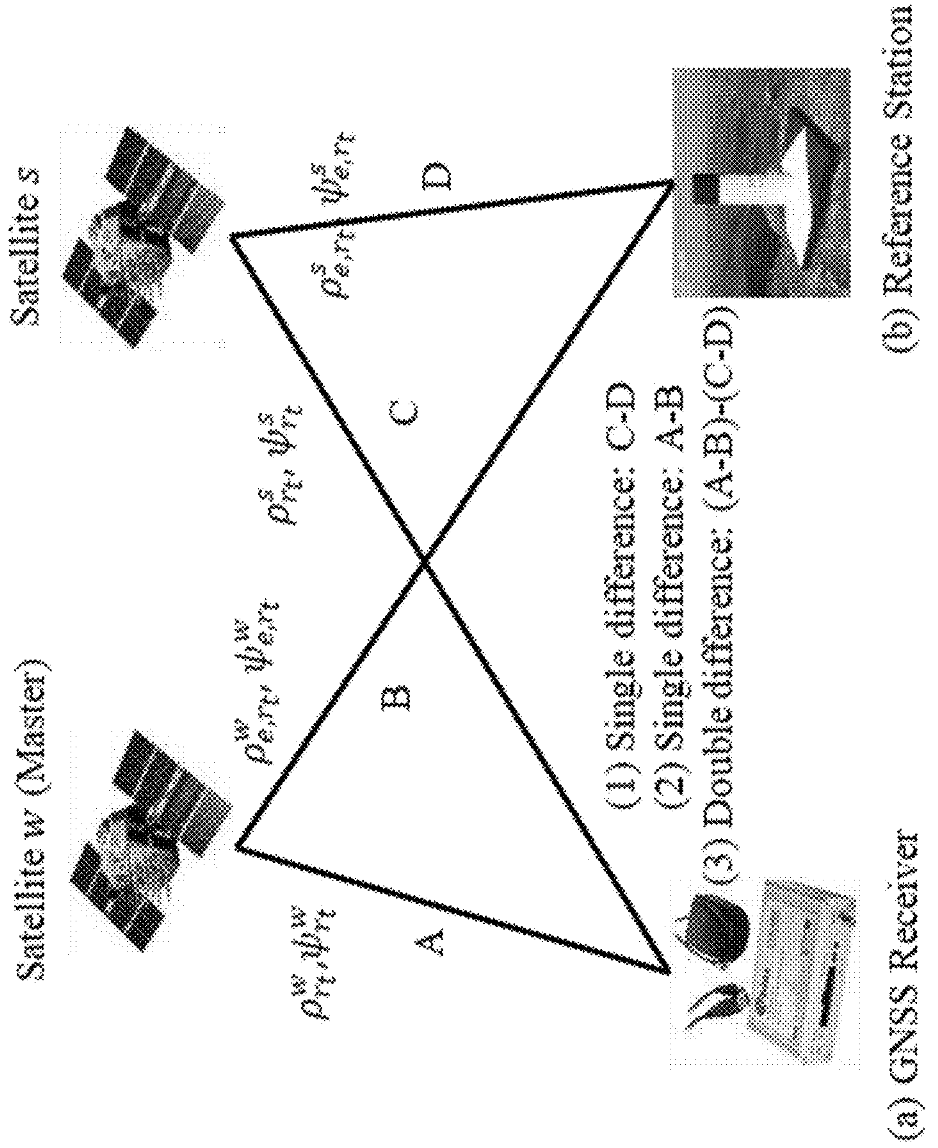
FIG. 3 is a demonstration of the double-difference technique: (a) GNSS receiver installed in the autonomous system; and (b) a reference station installed in open sky area with geodetic level GNSS receiver.

To improve the GNSS positioning accuracy, the double-difference method is adopted in the GNSS-RTK positioning to remove these systematic error terms, such as atmospheric and clock-related errors. FIG. 3 presents the illustration of the DD operation. Given the pseudorange and carrier-phase measurements received from a satellite s and a master satellite w, the DD pseudorange measurement $$\left(\rho_{DD,t}^s\right)$$

is expressed as $$\rho_{DD,r_t}^s = \left(\rho_{r_t}^s - \rho_{e,r_t}^s\right) - \left(\rho_{r_t}^w - \rho_{e,r_t}^w\right). \tag{3}$$

The variables $$\rho_{e,r_t}^{w}$$

and $$\rho_{e,r_t}^{s}$$

represent the pseudorange measurements received by the reference station that is denoted by the subscript "e".

Generally, the satellite with the highest elevation angle tends to involve the lowest multipath and NLOS errors. Therefore, the satellite w, with the highest elevation angle, is selected as the master satellite. By stacking (1) to (3), the following formula can be obtained:

$$\rho_{DD,r_t}^{s} = \left(r_{r_t}^{s} - r_{e,r_t}^{s}\right) - \left(r_{r_t}^{w} - r_{e,r_t}^{w}\right) + \varepsilon_{DD,r_t}^{s} \tag{4}$$

where $$\varepsilon_{DD,r_t}^{s}$$

denotes the noise related to the double-differenced pseudorange measurements. After applying the DD process to the pseudorange measurements, the derived $$\rho_{DD,r_t}^{s}$$

is free of the clock bias and atmosphere effects, based on the premise that the GNSS measurements received from the user-end receiver and the station receiver share the same atmosphere error.

Similarly, the DD carrier-phase measurement $$\left(\Phi_{DD,r_t}^{s}\right)$$

of satellite s is expressed as follows:

$$\psi_{DD,r_t}^{s} = \left(\psi_{r_t}^{s} - \psi_{e,r_t}^{s}\right) - \left(\psi_{r_t}^{w} - \psi_{e,r_t}^{w}\right) \tag{5}$$

The variables $$\Phi_{e,r_t}^{s}$$

and $$\Phi_{e,r_t}^{w}$$

represent the carrier-phase measurements received by the reference station. Similarly, the clock bias and atmosphere effects are waived from $$\psi_{DD,r_t}^{s}.$$

By stacking (2) to (5), the following formula can be obtained:

$$\psi_{DD,r_t}^{s} = \left(r_{r_t}^{s} - r_{e,r_t}^{s}\right) - \left(r_{r_t}^{w} - r_{e,r_t}^{w}\right) + N_{DD,r_t}^{s} + \epsilon_{DD,r_t}^{s} \tag{6}$$

where $$\epsilon_{DD,r_t}^{s}$$

is the noise related to the DD carrier-phase measurements.

$$N_{DD,r_t}^{s}$$

is the double-differenced integer ambiguity to be estimated.

B.2. Doppler Measurements Modeling

In terms of the measurements from the GNSS receiver, each Doppler measurement, $$d_{r_t}^{s},$$

is expressed as follows:

$$d_{r_t}^{s} = \frac{1}{\lambda_j}\left(e_{r_t}^{s}\left(v_{r_t}^{WE,s} - v_{r_t}^{WE}\right) + c\left(\dot{\delta}_{r_t}^{r,j} - \dot{\delta}_{r_t}^{s}\right)\right) + \varsigma_{r_t}^{s} \tag{7}$$

where $$\varsigma_{r_t}^{s}$$

refers to the noise related to the received Doppler measurement.

$$e_{r_t}^{s}$$

represents the line-of-sight vector connecting the GNSS receiver and the satellite s, and it can be calculated as follows:

$$e_{r_t}^{s} = \left(\frac{p_{r_t}^{WE,s} - p_{r_t}^{WE}}{\left\|p_{r_t}^{WE,s} - p_{r_t}^{WE}\right\|}\right)^{T} \tag{8}$$

where the operator ||*|| is employed to obtain the norm of the associated vector. Since the Doppler measurement encodes the motion difference between the satellite and GNSS receiver, the Doppler measurement is employed to constraint the relative motion of the GNSS receiver between two consecutive epoch and its application will be presented in the next section.

C. Improved Geometry: Tightly-Coupled Integration of GNSS

Rtk/Visual/Inertial

C.1. System State and Factor Graph Structure

To make use of the visual measurements, we follow the work [1]. The visual measurements, IMU measurements are tightly integrated with the GNSS DD pseudorange and carrier-phase measurements, together with the Doppler measurements using the sliding window factor graph optimization. Different from the VINS system, the GNSS measurements are reported in the ECEF frame. Therefore, the extrinsic parameters between the world local frame $(\bullet)^{WL}$ of the conventional VINS and the GNSS ECEF frame are also unknown that should also be estimated simultaneously. To achieve this, the states of the tightly-coupled system include the following.

(a) The position and orientation of the IMU body related to the world local frame are denoted as $$p_{b_k}^{WL}$$

and $$q_{b_k}^{WL},$$

respectively, with $b_k$ representing the body frame, in which the k-th image is captured.

(b) The velocity of the IMU body related to the world local frame is denoted as $$v_{b_k}^{WL}$$

together with the bias of gyroscope $b_{w_k}$ and accelerometer $b_{a_k}$.

(c) The inverse depth of the visual landmark is denoted as $f_m$.

(d) The extrinsic parameter between the world local frame $(\bullet)^{WL}$ and the ENU frame is denoted as $$T_{WL}^{WG} = [R_{WL}^{WG}, t_{WL}^{WG}].$$

Since the directions of the z-axis represent both the ENU frame and the world local frame of VINS, the $$R_{WL}^{WG}$$

only include one unknown degree that is yaw offset between both frames.

(e) The receiver clock drift is denoted as $$\dot{\delta}_{r_t}^{r}.$$

Therefore, the state set of the system inside a sliding window can be expressed as follows:

$$\chi = [x_0, \ldots, x_{K-1}, f_0, \ldots, f_{M-1}, T_{WL}^{WG}] \tag{9}$$

with $$x_k = [p_{b_k}^{WL}, q_{b_k}^{WL}, b_{a_k}, b_{w_k}, \dot{\delta}_{r_t}^{r}]$$

where K represents the size of the sliding window. M represents the total number of features involved in the sliding window. Since the data frequency of the GNSS raw measurement is different from the image, we interpolate the intermediate GNSS measurement at a time $r_t$ towards the keyframe at a time $b_k$.

Figure 4:
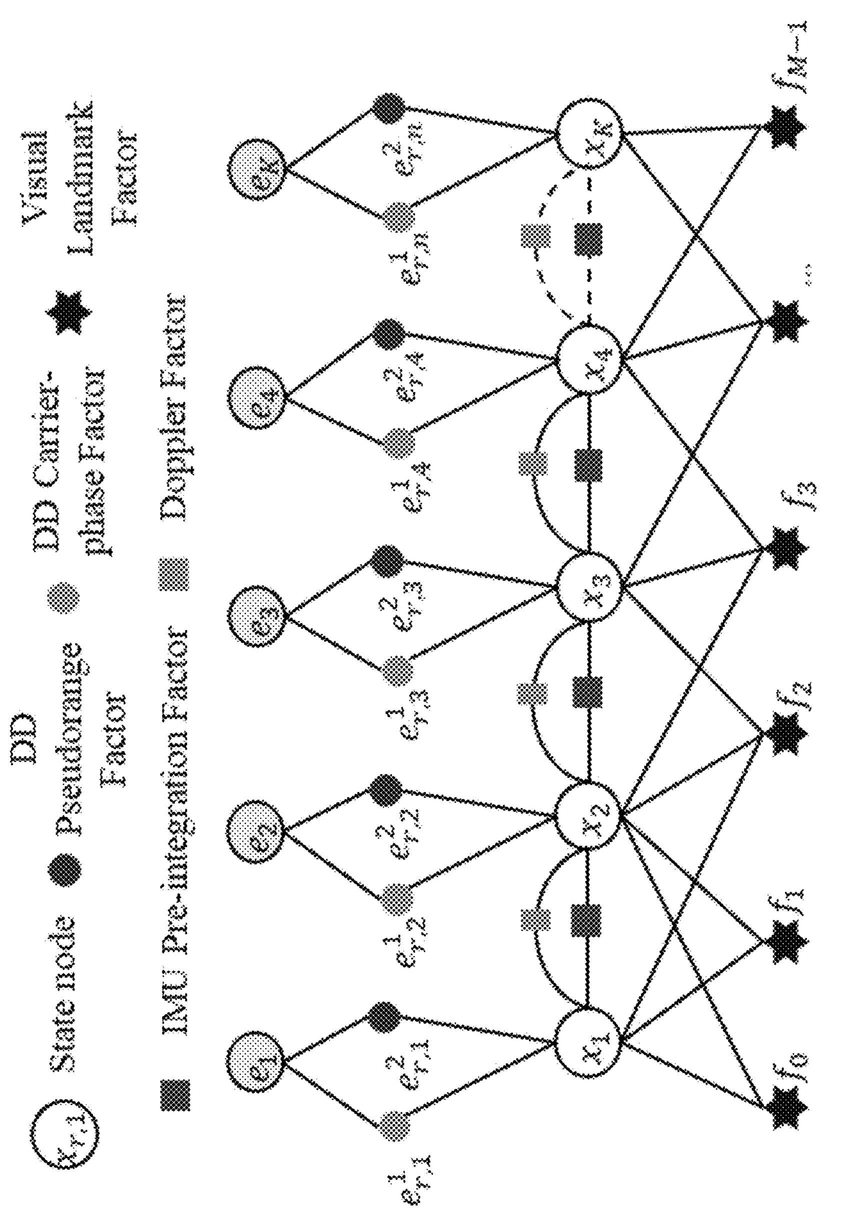
FIG. 4 is a factor graph structure of the proposed tightly coupled integration. Five types of factors are involved inside a sliding window.

The factor graph structure of the proposed tightly coupled integration via a sliding window factor graph optimization is shown in FIG. 4. Five types of factors are involved in the factor graph. The black and gray circles denote the DD pseudorange and carrier-phase factors, respectively. Note that the DD factor only connects a single epoch for simplicity although the DD factor is correlated with two consecutive epochs due to the interpolation. The black and gray rectangles denote the IMU pre-integration and Doppler factors, respectively. The five-pointed star denotes the visual landmark.

Specifically, the Doppler factor and IMU pre-integration factor provide the relative constraint between two consecutive epochs. The DD pseudorange and carrier-phase provide absolute constraint related to the ECEF frame that is free of drift. The visual factor provides the multi-epoch constraints across the factor graph. The rest of this section presents the formulation of those factors.

C.2. IMU Pre-Integration Factor

Similar to [1], the IMU pre-integration technique is employed to integrate the several measurements (inertial measurements between time intervals $t \in [t_k, t_{k+1}]$) into a single factor between two consecutive frames $b_k$ and $b_{k+1}$ with the residual $r_{\mathcal{B}}(\bullet)$ expressed as $$r_{\mathcal{B}}(\hat{z}_{b_{k+1}}^{b_k}, \chi).$$

Since the IMU pre-integration employed in the present disclosure is identical to [1], the reader is suggested to refer to formulas (14), (16), and (17) of [1] for details of the IMU pre-integration.

C.3. Visual Landmark Factor

The visual measurement employed in this study is a set of features detected by the Shi-Tomasi corner algorithm. Considering that lth feature is first observed in the ith image, and it is observed again in jth image, let $$(\hat{u}_l^{c_i}, \hat{v}_l^{c_i})$$

represent the pixel position of Ith feature in the ith image, and let $$(\hat{u}_l^{c_j}, \hat{v}_l^{c_j})$$

represent the pixel position of Ith feature in the jth image. Therefore, the reprojection model of Ith feature from the ith image to the jth image can be further expressed as:

$$p_l^{c_j} = R_b^c\left(R_w^{b_j}\left(R_{b_i}^w\left(R_c^b \frac{1}{\lambda_l}\pi_c^{-1}\left(\begin{bmatrix}\hat{u}_l^{c_i}\\ \hat{v}_l^{c_i}\end{bmatrix}\right) + p_c^b\right) + p_{b_i}^w - p_{b_j}^w\right) - p_c^b\right).$$

Let $$p_l^{c_j}$$

represent the 3D coordinates of the Ith feature with:

$$\overline{p}_l^{c_j} = \frac{p_l^{c_j}}{\|p_l^{c_j}\|} \tag{11}$$

where $$\overline{p}_l^{c_j}$$

represents the expected observation in the normalized plane. Let the observation measurement of Ith feature in the jth image be $$\hat{\overline{p}}_l^{c_j}.$$

It follows that $$\hat{\overline{p}}_l^{c_j} = \pi_c^{-1} = \left(\begin{bmatrix}\hat{u}_l^{c_j}\\ \hat{v}_l^{c_j}\end{bmatrix}\right). \tag{12}$$

Hence, the reprojection residual model can be derived as follows:

$$r_C(\hat{z}_l^{c_j}, \mathcal{X}) = (\hat{\overline{p}}_l^{c_j} = -\overline{p}_l^{c_j}) \tag{13}$$

where $\mathcal{C}$ represents the set of features that have been observed at least twice. $r_{\mathcal{C}}(\cdot)$ represents the residual of the lth feature measurement in the jth image.

$$\hat{z}_l^{c_j}$$

represents the observation measurement.

C.4. GNSS DD Pseudorange/Carrier-Phase Factor

Since the GNSS measurement are represented in the ECEF frame, the extrinsic parameter between the ECEF frame and the world local frame can be expressed as $$T_{WL}^{WE} = T_{WG}^{WE} T_{WL}^{WG}.$$

In the present disclosure, the first point is selected as the reference position for the ENU frame, which can be expressed as $$p_{ref}^{WE} \text{ with } p_{WG}^{WE} = p_{ref}^{WE}.$$

C.4.1. DD Pseudorange Factor

Given a DD pseudorange measurement received at epoch $r_t$, the residual can be expressed as follows:

$$r_\rho(\rho_{DD,r_t}^s, p_{r_t,b}^{WL}) = (r_{r_t}^s - r_{e,r_t}^s) - (r_{r_t}^w - r_{e,r_t}^w) - \rho_{DD,r_t}^s \tag{14}$$

where the variable $$p_{r_t,b}^{WL}$$

represents the position of the IMU body frame (IMU sensor frame) at the given epoch $$r_t.\ r_{r_t}^s \text{ and } r_{r_t}^w$$

represent the range distances between the GNSS receiver and the satellite s and w, and they can be expressed as follows:

$$\begin{aligned} r_{r_t}^s &= \|p_{r_t}^{WE,s} - (R_{WG}^{WE}R_{WL}^{WG}p_{r_t}^{WL} + R_{WG}^{WE}p_{WL}^{WG} + p_{WG}^{WE})\|, \\ r_{r_t}^w &= \|p_{r_t}^{WE,w} - (R_{WG}^{WE}R_{WL}^{WG}p_{r_t}^{WL} + R_{WG}^{WE}p_{WL}^{WG} + p_{WG}^{WE})\|. \end{aligned} \tag{15}$$

Similarly, $$r_{e,r_t}^s \text{ and } r_{e,r_t}^w$$

represent the range distance between the reference station and satellite s and the master satellite w (refer to FIG. 3), and they can be expressed as follows:

$$\begin{aligned} r_{e,r_t}^s &= \|p_{r_t}^{WE,s} - p_e\|, \\ r_{e,r_t}^w &= \|p_{r_t}^{WE,w} - p_e\|. \end{aligned} \tag{16}$$

Meanwhile, $$p_{r_t}^{WL}$$

can be expressed as follows:

$$p_{r_t}^{WL} = p_{r_t,b}^{WL} + R_{r_t,b}^{WL} p_r^b \tag{17}$$

where $$p_r^b$$

represents the translation between the GNSS receiver and the IMU sensor frame. However, the position estimation of the IMU body frame $$p_{r_t,b}^{WL}$$

at GNSS epoch $r_t$ cannot be directly obtained. Assume that the GNSS epoch $r_t$ locates between two image keyframes $[t_k, t_{k+1}]$ with $r_t \in [t_k, t_{k+1}]$, the following linear interpolation can be adopted:

$$p_{r_t,b}^{WL} = \frac{(t_{k+1} - r_t)}{(t_{k+1} - t_k)} p_{b_k}^{WL} + \left(1 - \frac{(t_{k+1} - r_t)}{(t_{k+1} - t_k)}\right) p_{b_{k+1}}^{WL}. \tag{18}$$

C.4.2. DD Carrier-Phase Factor

Given a DD carrier-phase measurement received at epoch $r_t$, the residual can be expressed as follows:

$$r_\psi\left(\psi_{DD,r_t}^s, p_{r_t,b}^{WL}\right) = \left(r_{r_t}^s - r_{e,r_t}^s\right) - \left(r_{r_t}^w - r_{e,r_t}^w\right) + N_{DD,r_t}^s - \lambda_j \psi_{DD,r_t}^s \tag{19}$$

Similarly, the uncertainty related to the DD carrier-phase factor $$r_\psi\left(\psi_{DD,r_t}^s, p_{r_t,b}^{WL}\right)$$

is calculated based on the SNR and elevation angle.

C.5. GNSS Doppler Factor

Given a Doppler measurement received at epoch $r_t$, the residual can be expressed as follows:

$$r_d\left(d_{r_t}^s, v_{r_t,b}^{WL}\right) = \frac{1}{\lambda_j}\left(e_{r_t}^s\left(v_{r_t}^{WE,s} - R_{WG}^{WE} R_{WL}^{WG} v_{r_t}^{WL}\right) + c\left(\dot{\delta}_{r_t}^{r,j} - \dot{\delta}_{r_t}^{s}\right)\right) - d_{r_t}^s \tag{20}$$

with $$v_{r_t}^{WL} = v_{r_t,b}^{WL} + R_{r_t,b}^{WL}\left[p_r^b\right] \times \left(\omega_{r_t} - b_{\omega_{r_t}}\right)$$

where the $$v_{r_t}^{WL}$$

represents the velocity of the GNSS receiver at epoch $r_t$ related to the local world frame. The operator $[*]_x$ is employed to obtain the skew-symmetric matrix corresponding to a vector. Similar time interpolation is employed to the velocity constraint.

$$e_{r_t}^s$$

represents the line-of-sight vector connecting the GNSS receiver and the satellite s, and it can be expressed as follows:

$$e_{r_t}^s = \frac{p_{r_t}^{WE,s} - \left(R_{WG}^{WE} R_{WL}^{WG} p_{r_t}^{WL} + R_{WG}^{WE} p_{WL}^{WG} + p_{WG}^{WE}\right)}{\left\|p_{r_t}^{WE,s} - \left(R_{WG}^{WE} R_{WL}^{WG} p_{r_t}^{WL} + R_{WG}^{WE} p_{WL}^{WG} + p_{WG}^{WE}\right)\right\|}. \tag{21}$$

C.6. Marginalization Factor

To maintain the efficiency and consistency of the state estimation inside of the sliding window, the oldest keyframe is marginalized and the associated factors are added as a prior, such as IMU pre-integration factor, visual factor, and GNSS-related factors by applying the Schur complement. The marginalization plays an important role in sliding window optimization as it incorporates the historical information into a prior. The prior information from marginalization is denoted as $\{r_p, H_p\}$ with the $r_p$ and $H_p$ represents the prior residual and information matrix, respectively.

C.7. Tightly Coupled Optimization

Based on the factors derived above, the states inside the sliding window can be estimated by solving the following objective function:

$$\chi^* = \underset{\chi}{\arg\min} \sum_{s,r_t,t,b_k} \Big( \|r_p - H_p\chi\|^2 + \left\|r_{\mathcal{B}}\left(\hat{z}_{b_{k+1}}^{b_k}, \chi\right)\right\|_{\Sigma_{\mathcal{B}}}^2 + \left\|r_{\mathcal{C}}\left(\hat{z}_l^{c_j}, \chi\right)\right\|_{\Sigma_{\mathcal{C}}}^2 + \left\|r_\rho\left(\rho_{DD,r_t}^s, p_{r_t,b}^{WL}\right)\right\|_{\sigma_{\rho,r_t}^s}^2 + \left\|r_\psi\left(\psi_{DD,r_t}^s, p_{r_t,b}^{WL}\right)\right\|_{\sigma_{\psi,r_t}^s}^2 + \left\|r_d\left(d_{r_t}^s, v_{r_t,b}^{WL}\right)\right\|_{\sigma_{d,r_t}^s}^2 \Big) \tag{22}$$

where $\Sigma_{\mathcal{B}}$ and $\Sigma_{\mathcal{C}}$ represents the covariance matrix related to the IMU pre-integration and visual reprojection, respectively. The uncertainty $$\left(\sigma_{\rho,r_t}^s\right)$$

related to the DD pseudorange factor $$r_\rho\left(\rho_{DD,r_t}^s, p_{r_t,b}^{WL}\right)$$

is calculated based on the SNR and elevation angle. A similar method is applied for the uncertainty estimation of the DD carrier-phase $$\left(\sigma_{\psi,r_t}^s\right)$$

and $$\sigma_{\psi,r_t}^s = k_\psi \sigma_{\rho,r_t}^s$$

with a scaling factor $k_\psi$=100. Similarly, the uncertainty of Doppler measurements $$\left(\sigma_{d,r_t}^s\right)$$

is $$\sigma^s_{d,r_t} = k_d \sigma^s_{\rho,r_t}$$

with a scaling factor $k_d$=3.

D. System Initialization

The initialization of the system state is significant for the estimator with high nonlinearity related to equation (22). The initialization mainly involves two parts, the VI initialization, and GNSS-VI initialization which refers to the extrinsic parameters between GNSS-RTK and VINS, which are to be presented as follows.

D.1. VI Initialization

The VI initialization includes the recovery of the scale of the features, the bias of gyroscope, accelerometers, etc. We follow the work [1] to complete the visual/inertial initialization. Meanwhile, the outcome of the VI initialization includes a set position and velocity of the keyframes inside the sliding window, denoted by $$\{p^{WL}_{b_k} | k = 0, \ldots, K-1\}$$

and $$\{v^{WL}_{b_k} | k = 0, \ldots, K-1\},$$

which will be used for the GNSS-VI initialization subsequently.

D.2. GNSS-VI Initialization

The GNSS-VI initialization aims to get the initial guess for those GNSS-related states, such as the integer ambiguity, the receiver clock bias drift rate, and the extrinsic parameter $$(T^{WG}_{WL})$$

between the ENU frame and the world local frame. Conventionally, the initial guess of the GNSS-related states can be estimated via epoch-by-epoch-based WLS. Subsequently, the initial guess of the extrinsic parameters $$T^{WG}_{WL}$$

can be optimized by aligning the two trajectory sets estimated from the VI initialization and GNSS WLS, respectively. For convenience, "trajectory set" and "position set" are used herein interchangeably with the same meaning. However, the potential of Doppler measurements is neglected in this conventional approach. Meanwhile, the carrier-phase is not adopted due to the unknown integer ambiguity. To this end, we propose to estimate the velocity set and trajectory set inside the sliding window simultaneously based on the Doppler, DD pseudorange, and carrier-phase measurements. Given the fact that the carrier-phase measurements received from the same satellite s inside the sliding window involve the same integer ambiguity value, the left null space matrix is employed to eliminate the shared integer ambiguity within the sliding window in this study, which enables the utilization of the DD carrier-phase measurement without resolving the known integer ambiguity.

Given a set of carrier-phase measurements from satellite s received in multiple discrete epochs, they can be stacked into the following form:

$$\begin{bmatrix} \lambda_j \psi^s_{DD,0} \\ \lambda_j \psi^s_{DD,1} \\ \ldots \\ \lambda_j \psi^s_{DD,K-1} \end{bmatrix} = \begin{bmatrix} m^s_{r,0} \\ m^s_{r,1} \\ \ldots \\ m^s_{r,K-1} \end{bmatrix} + \begin{bmatrix} N^s_{DD,0} \\ N^s_{DD,1} \\ \ldots \\ N^s_{DD,K-1} \end{bmatrix} + \begin{bmatrix} \epsilon^s_{DD,0} \\ \epsilon^s_{DD,1} \\ \ldots \\ \epsilon^s_{DD,K-1} \end{bmatrix} \quad (23)$$

with $$m^s_{r,t} = (r^s_{r_t} - r^s_{e,r_t}) - (r^w_{r,r_t} - r^w_{e,r_t})$$

where K represents the size of the sliding window, which means that the satellite s is tracked by the GNSS receiver continuously for K epochs. The $$m^s_{r,t}$$

is defined for simplicity.

Given the fact that the carrier-phase measurements inside the window share the same integer ambiguity, (23) can be rewritten as follows:

$$\begin{bmatrix} \lambda_j \psi^s_{DD,0} \\ \lambda_j \psi^s_{DD,1} \\ \ldots \\ \lambda_j \psi^s_{DD,K-1} \end{bmatrix} = \begin{bmatrix} m^s_{r,0} \\ m^s_{r,1} \\ \ldots \\ m^s_{r,K-1} \end{bmatrix} + N^s_{DD,K-1} \begin{bmatrix} 1 \\ 1 \\ \ldots \\ 1 \end{bmatrix} + \begin{bmatrix} \epsilon^s_{DD,0} \\ \epsilon^s_{DD,1} \\ \ldots \\ \epsilon^s_{DD,K-1} \end{bmatrix}. \quad (24)$$

The compact form of the (24) can be further organized by multiplying a left null space matrix $$G^s_{r,k}$$

on both sides of formula (23), and hence the following form can be obtained:

$$G^s_{DD,K} \begin{bmatrix} \lambda_j \psi^s_{DD,0} \\ \lambda_j \psi^s_{DD,1} \\ \ldots \\ \lambda_j \psi^s_{DD,K-1} \end{bmatrix} = G^s_{DD,K} \begin{bmatrix} m^s_{r,0} \\ m^s_{r,1} \\ \ldots \\ m^s_{r,K-1} \end{bmatrix} + G^s_{DD,K} \begin{bmatrix} \epsilon^s_{DD,0} \\ \epsilon^s_{DD,1} \\ \ldots \\ \epsilon^s_{DD,K-1} \end{bmatrix} \quad (25)$$

with $$G^s_{DD,K} \begin{bmatrix} 1 \\ 1 \\ \ldots \\ 1 \end{bmatrix} = \begin{bmatrix} 0 \\ 0 \\ \ldots \\ 0 \end{bmatrix}.$$

Therefore, the derived formula (25) is free of ambiguity variable which is eliminated by a left multiplication of the left null space matrix $$G^s_{DD,K}.$$

The elimination of the integer ambiguity is inspired by an earlier work that a similar elimination is employed to avoid the repetitive estimation of the position of landmarks. The feasibility of the integer ambiguity elimination via the left null space matrix is previously shown in our recent study, where the GNSS Doppler/pseudorange fusion is smoothed by the ambiguity-free carrier-phase measurements. Therefore, the residual of the ambiguity free DD carrier-phase measurement can be derived as follows:

$$r_{\mho_s}\left(\psi^s_{DD,0}, \ldots, \psi^s_{DD,K-1}, p^{WL}_{0,b}, \ldots, p^{WL}_{K-1,b}\right) = G^s_{DD,K}\begin{bmatrix} \lambda_j\psi^s_{DD,0} \\ \lambda_j\psi^s_{DD,1} \\ \ldots \\ \lambda_j\psi^s_{DD,K-1} \end{bmatrix} - G^s_{DD,K}\begin{bmatrix} m^s_{r,0} \\ m^s_{r,1} \\ \ldots \\ m^s_{r,K-1} \end{bmatrix} \tag{26}$$

where $\mho_{s\ s}$ represents a set of DD carrier-phase measurements for satellite s inside a sliding window with the same integer ambiguity. Therefore, the trajectory and the velocity sets of the sliding window can be estimated based on Doppler, DD pseudorange, and ambiguity-free carrier-phase measurement as follows:

$$\beth^* = \arg\min_{\beth} \sum_{s,r_t,t,b_k} \left( \left\| r_\rho\left(\rho^s_{DD,r_t}, p^{WL}_{r_t,b}\right)\right\|^2_{\sigma^s_{\rho,r_t}} + \left\| r_{\mho_s}\left(\psi^s_{DD,0}, \ldots, \psi^s_{DD,K-1}, p^{WL}_{0,b}, \ldots, p^{WL}_{K-1,b}\right)\right\|^2_{\Sigma^s_{\mho_s}} + + \left\| r_d\left(d^s_{r_t}, v^{WL}_{r_t,b}\right)\right\|^2_{\sigma^s_{d,r_t}} \right) \tag{27}$$

where $\beth$ represents a set of states, including the position, velocity, and the receiver clock bias drift rate.

$$\sum\nolimits^s_{\mho_s}$$

represents the covariance matrix related to a set of DD carrier-phase measurements $\Sigma^s_{\mho_s}$, which can be expressed as follows:

$$\Sigma^{WCP,s}_{r,k} = G^s_{r,k}\begin{bmatrix} \sigma^s_{\psi,r_t} & 0 & 0 & 0 \\ 0 & \sigma^s_{\psi,r_t} & 0 & 0 \\ 0 & 0 & \ldots & 0 \\ 0 & 0 & 0 & \sigma^s_{\psi,r_t} \end{bmatrix} G^{s\ T}_{r,k}. \tag{28}$$

Therefore, the position and velocity set expressed in the ECEF frame can be estimated by solving formula (27) denoted by $$\left\{p^{WE}_{r_t} \,\middle|\, k = 0, \ldots, K-1\right\} \text{ and } \left\{v^{WE}_{r_t} \,\middle|\, k = 0, \ldots, K-1\right\}$$

with $r_t \in [t_k, t_{k+1}]$, respectively.

Based on the estimated trajectory and velocity sets from VI initialization and optimization of formula (26), the extrinsic parameter $$T^{WG}_{WL}$$

between the ENU frame and the world local frame can be estimated by solving the following aligning objective function:

$$T^{WG^*}_{WL} = \arg\min_{T^{WG}_{WL}} \sum_{s,r_t,t,b_k} \left( \left( \left\| R^{WE^T}_{WG}\left(p^{WE}_{r_t} - p^{WE}_{WG}\right) - R^{WG}_{WL}\left(p^{WL}_{r_t,b} - R^{WL}_{r_t,b}p^b_r\right) - p^{WG}_{WL} \right\|^2 \right) + \left( \left\| R^{WE^T}_{WG} v^{WE}_{r_t} - R^{WG}_{WL}\left(v^{WL}_{r_t,b} + R^{WL}_{r_t,b}\left[p^b_r\right]_\times\left(\omega_{r_t} - b_{\omega_{r_t}}\right)\right) \right\|^2 \right) \right) \tag{29}$$

where $$T^{WG^*}_{WL}$$

represents the optimal extrinsic parameter to be estimated. Meanwhile, similar time interpolation logic is employed to obtain $$v^{WL}_{r_t,b}$$

from $$\left\{v^{WL}_{b_k} \,\middle|\, k = 0, \ldots, K-1\right\}.$$

The extrinsic parameter estimation takes advantage of both the Doppler and DD pseudorange measurements. Meanwhile, the elimination operation enables the utilization of the high accuracy carrier-phase measurement without resolving the integer ambiguity. It has been demonstrated in a previous study that the multi-epochs carrier-phase constraint (corresponding to (26)) can generate a significantly smoother trajectory compared with a single epoch DD carrier-phase constraint. Therefore, the GNSS-VI initialization is completed with the extrinsic parameter $$\left(T^{WG}_{WL}\right)$$

estimated from formula (29).

E. Experiment Results and Discussion

E.1. Experiment Setup

Experimental scenarios. To verify the effectiveness of the proposed method, two experiments were conducted in urban canyons (FIG. 5) in Hong Kong. The top-left and bottom-left figures present the scenario of the evaluated urban canyons. Both urban scenarios contain static buildings, trees, and dynamic objects, such as double-decker buses, which can cause potential GNSS NLOS receptions. To see how the proposed method works in scenarios with different levels of urbanization, we first experiment with a typical urban canyon in Hong Kong (urban canyon 1 in FIG. 5(*a*)). Subsequently, the other experiment was conducted in a more urbanized scenario (urban canyon 2 in FIG. 5(*b*)) with denser and taller building structures, which is more challenging for GNSS-RTK positioning.

Figure 5:
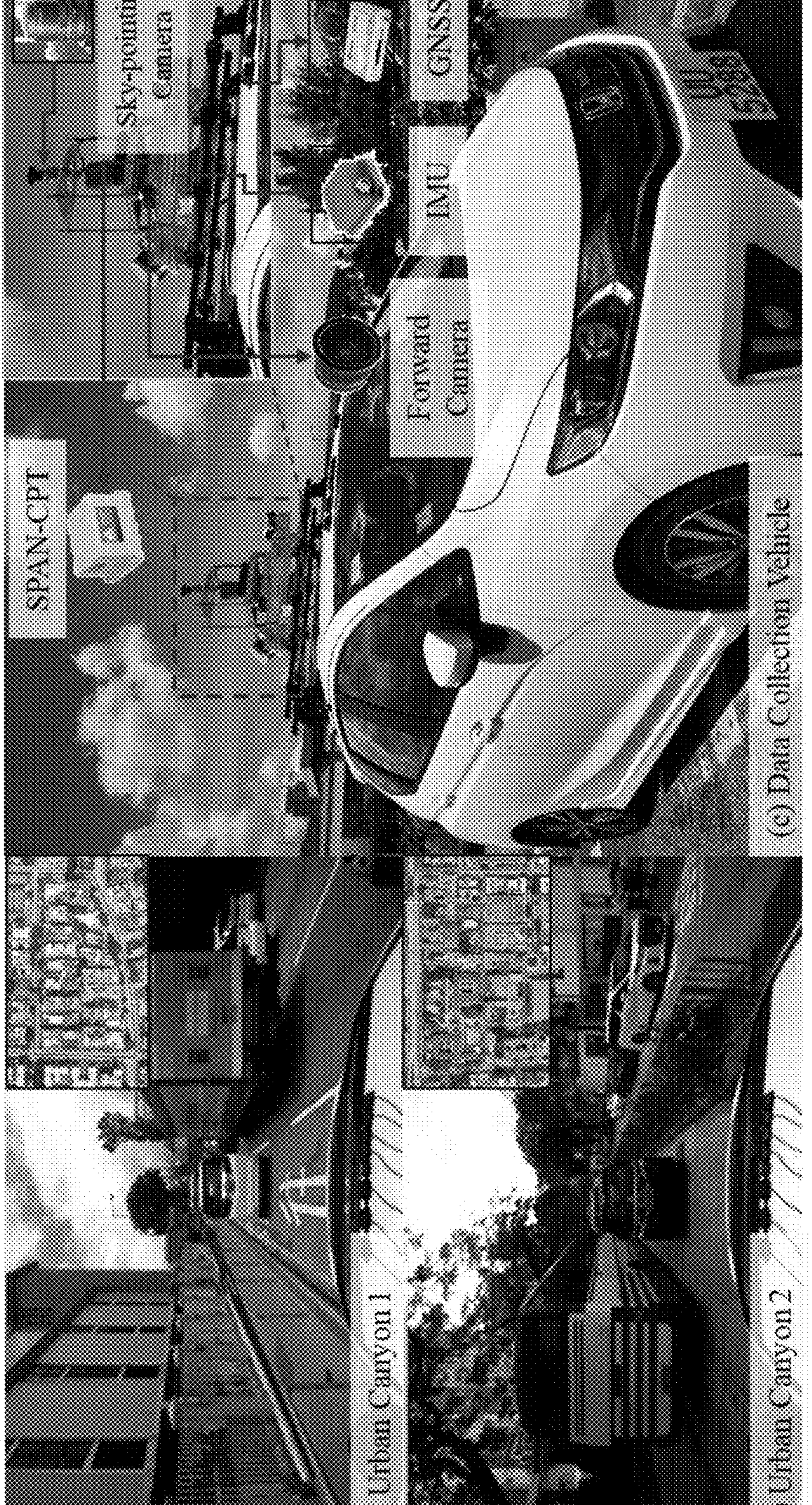
FIG. 5 is a demonstration of the experimental vehicle and the evaluated urban canyons 1 and 2.

Sensor setups. The details of the data collection vehicle can be found through our recently open-sourced UrbanNav dataset (github.com/weisongwen/UrbanNavDataset), which includes multi-sensor data collected in typical urban canyons in Hong Kong and Tokyo. In both experiments, a low-cost automobile-level u-blox M8T GNSS receiver was employed to collect raw single-frequency GPS/BeiDou measurements at a frequency of 10 Hz. The Xsens Ti-10 IMU was employed to collect data at the frequency of 400 Hz. A forward-looking monocular camera was employed to capture the visual features with a FOV of 90° (horizontal)×60° (vertical) at a frequency of 10 Hz, together with a sky-pointing fish-eye camera capturing the sky view image with a FOV of 185° at a frequency of 10 Hz. The sensor setup is shown in FIG. 5(*c*). Besides, the NovAtel SPAN-CPT, a GNSS (GPS, GLONASS, and BeiDou) RTK/INS (fiber-optic gyroscopes, FOG) integrated navigation system was employed to provide ground truth of positioning. All data were post-processed with a desktop (Intel Core i7-9700K CPU, 3.60 GHz) computer.

Evaluation methods: We verify the effectiveness of the proposed method step-by-step by comparing the following four methods:

RTK: the GNSS-RTK positioning results using the conventional method. This is to show how the conventional GNSS real-time kinematic positioning performs in the evaluated urban canyon datasets.

RTK-NE: GNSS RTK positioning aided by the GNSS NLOS exclusion (NE) based on the outlier removal presented in Section A.1. This is on top of the method RTK. This is to verify the contribution of the GNSS NLOS removal.

RTK-NE-VINS: loosely integrate the result from RTK-NE with the pose estimation from VINS in a conventional manner via factor graph optimization. This is to show how the loosely coupled integration of VINS and GNSS-RTK works even when the GNSS NLOS receptions are removed.

RTK-IG: the proposed method where the geometry constraints are improved by tightly coupling the visual measurements with the healthy GNSS measurements based on Section C. This is to demonstrate the improvement resulting from the tightly coupled visual measurements with GNSS-RTK, which is the main contribution of the present disclosure. It shall be noted that the GNSS NLOS receptions are not detected in this method. "IG" denotes improving geometry.

RTK-NE-IG: the proposed method where the GNSS NLOS receptions are removed and geometry constraints are improved by tightly coupling the visual measurements with the healthy GNSS measurements based on Section C. This is to demonstrate the improvement resulting from both the NLOS exclusion and geometry improvement.

E.2. Experimental Evaluation in Urban Canyon 1

E.2.1. Evaluation of Positioning Performance

Figure 6:
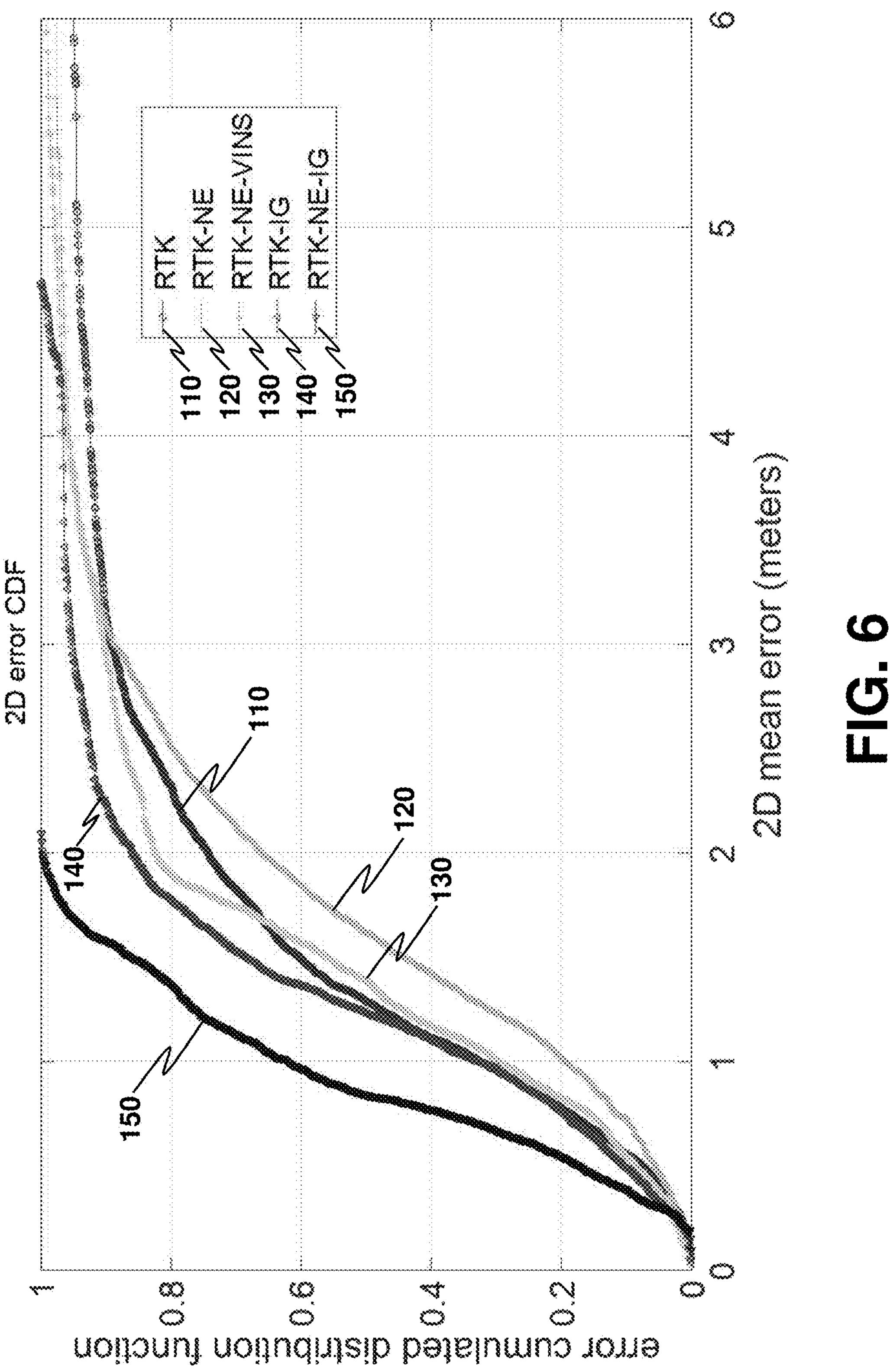
FIG. 6 is the cumulated distribution function for 2D positioning errors of the evaluated five methods in urban canyon 1.

The positioning performance of those five methods is shown in Table 1. The ECDFs are shown in FIG. 6. A mean error of 1.83 meters is obtained using the conventional GNSS-RTK positioning method with a standard deviation of 2.01 meters. Moreover, the maximum error reaches 30 meters, which is far from the positioning requirement of autonomous systems, due to the GNSS NLOS receptions from tall surrounding building structures. After excluding the detected GNSS NLOS receptions through the RTK-NE method, the error is decreased to 1.78 meters. It could be found that the improvement (2.7%) is limited compared with the conventional RTK method. This is caused by the distortion of the satellite geometry due to the NLOS exclusion. In other words, the GNSS NLOS exclusion can increase the DOP, which would increase the uncertainty of GNSS positioning. Moreover, the availability decreases from 99.1% to 72% for RTK-NE since the excessive GNSS NLOS exclusion can even cause an insufficient number of satellite measurements for GNSS positioning. However, the standard deviation and the maximum errors are decreased significantly after excluding the outlier GNSS NLOS receptions, which shows the effectiveness of the GNSS NLOS exclusion in mitigating the adverse impacts of gross outlier measurements.

TABLE 1

Positioning performance of the evaluated five methods in urban canyon 1 (2D/3D: horizontal/3D positioning).

| All Data | RTK | RTK-NE | RTK-NE-VINS | RTK-IG | RTK-NE-IG |
|---|---|---|---|---|---|
| 2D MEAN | 1.83 | 1.78 | 1.59 | 1.36 | 0.84 |
| 2D STD | 2.01 | 1.25 | 1.06 | 0.84 | 0.39 |
| 2D Max | 30.33 | 9.06 | 6.53 | 4.7 | 1.94 |
| 2D Impr. | — | 2.7% | 13.11% | 25.46% | 54.09% |
| 3D MEAN | 4.26 | 5.12 | 4.21 | 2.44 | 2.27 |
| 3D STD | 6.27 | 3.76 | 2.15 | 0.81 | 0.85 |
| 3D Max | 37.62 | 25.56 | 9.85 | 4.8 | 3.68 |
| 3D Impr. | — | −20% | 1.17% | 42.72% | 46.70% |
| Fixed Rate | 0% | 0% | 0% | 0.49% | 1.67% |
| Avail. | 99.1% | 72% | 100% | 100% | 100% |

The improvement (Impr.) is calculated concerning the RTK method.
STD denotes the standard deviation.
"Avail." denotes the availability.

Then we go one step further to integrate the improved GNSS-RTK positioning result from the RTK-NE method with the pose estimation from the VINS based on the work to see how the VINS can help the GNSS-RTK in a loosely coupled manner. Fortunately, the mean error decreases to 1.59 meters with the assistance of the VINS, which causes an improvement of 13.11%. Meanwhile, both the standard deviation and the maximum error decrease slightly. Moreover, the availability increases to 100% on the ground that the state estimation from VINS is continuously available. The improved results demonstrate that the integration of the VINS contributes to resisting the outlier GNSS measurements. However, the improvement is still limited because the loosely coupled integration cannot fully explore the complementariness between GNSS and visual measurements. Furthermore, no fixed solution is estimated from RTK, RTK-NE, and RTK-NE-VINS methods with the fixed-rate of 0%.

Interestingly, further improved results are obtained by tightly integrating the visual measurements with the GNSS DD pseudorange, carrier-phase, and Doppler measurements based on the RTK-IG method presented in Section C. The mean error decreases to 1.36 meters with an improvement of 25.46%. Meanwhile, the standard deviation is significantly decreased to 0.84 meters. The results demonstrate that the tightly coupled integration can obtain better performance compared with the loosely coupled integration. The improvement from the tightly coupled integration benefits from two major reasons: (1) the tightly coupled visual measurement can essentially improve the geometry constraint as elaborated in Section C; (2) both the visual and GNSS measurements can be modeled in a more precise manner. With the assistance of the visual constraint improving the geometry, a fixed rate of 0.49% is obtained by the RTK-IG method. This achievement shows the effectiveness of the proposed method in improving the geometry of conventional GNSS-RTK. However, the maximum error still reaches 4.7 meters due to the unexpected GNSS NLOS receptions. To further see how the GNSS NLOS exclusion can help to improve the RTK-IG method, we remove the GNSS NLOS receptions during the tightly coupled integration leading to the RTK-NE-IG method. The mean error decreases to 0.84 meters with an improvement of 54.09%. A significantly decreased standard deviation of 0.39 meters is obtained with the maximum error decreasing to only 1.94 meters. The results demonstrate that the GNSS NLOS exclusion can significantly improve the performance of GNSS-IG. Moreover, an increased fixed rate of 1.67% is obtained, which further proves the effectiveness of NLOS exclusion compared with the RTK-IG.

Although the focuses of navigation requirements are mainly placed on the 2D positioning (the horizontal positioning), we still present the result of 3D positioning performance in the bottom part of Table 1, in an attempt to further show whether the proposed method can also improve the vertical positioning compared with the conventional RTK method. The 3D mean error of the conventional RTK method reaches more than 4 meters. Meanwhile, the 3D mean error increases to 5.12 meters using the RTK-NE. This is mainly caused by the GNSS NLOS exclusion, which can lead to larger VDOP, thus causing larger vertical positioning errors. The 3D mean error decreases slightly with the assistance of the loosely coupled integration of VINS with an improvement of 1.17%. Significantly decreased 3D mean error is obtained after applying the RTK-IG method with an improvement of 42.72%. Further improved 3D positioning is obtained by the GNSS NLOS exclusion with an improvement of 46.70% using RTK-NE-IG.

In short, the gradually decreased positioning error demonstrates the contributions of both the GNSS NLOS exclusion and the geometry improvement, which can also be proven by ECDFs 110, 120, 130, 140, 150 shown in FIG. 6 for the RTK, RTK-NE, RTK-NE-VINS, RTK-IG, and RTK-NE-IG, respectively. Meanwhile, 100% availability is obtained through the proposed method (RTK-NE-VINS). It can be found that the remaining positioning error still reaches 0.84 meters, mainly because the GNSS multipath effect is not considered in the present work and it is another notorious error source. Since the multipath phenomenon involves both the direct and reflected signals, it cannot be directly detected through sky view visibility.

E.2.2. Evaluation of Rotation Performance

Conventionally, the GNSS receiver only provides the positioning estimation. The attitude of the system cannot be directly estimated by the GNSS measurements. However, the visual and inertial measurements conduce to determining the attitude of the system. Therefore, it is interesting to see how the proposed method works in attitude estimation. Since the RTK, and RTK-NE do not provide attitude estimation, we only compare the results from RTK-NE-VINS, RTK-IG, and RTK-NE-IG methods which are shown in Table 2.

The absolute rotation accuracy is evaluated based on the popular EVO tool kit. A mean error of 5.18 degrees is obtained using the RTK-NE-VINS with a standard deviation of 3.57 degrees. With the assistance of the tightly coupled integration of visual measurements, the mean error of attitude decreases to 3.01 degrees with a decreased standard deviation of 1.71 degrees. Interestingly, the mean attitude error decreases slightly to 2.73 degrees with the assistance of GNSS NLOS exclusion by RTK-NE-IG. In short, the slightly improved attitude estimation is also obtained through the proposed method (RTK-NE-IG), compared with the conventional loosely coupled integration (RTK-NE-VINS).

TABLE 2

Absolute rotation accuracy of the three methods in urban canyon 1.

| All Data (degree) | RTK-NE-VINS | RTK-IG | RTK-NE-IG |
|---|---|---|---|
| MEAN | 5.18 | 3.01 | 2.73 |
| STD | 3.57 | 1.71 | 1.56 |
| Max | 6.18 | 3.84 | 3.75 |
| Min | 1.13 | 1.08 | 0.91 |

E.2.3. Analysis of Geometry Constraint

Figure 7:
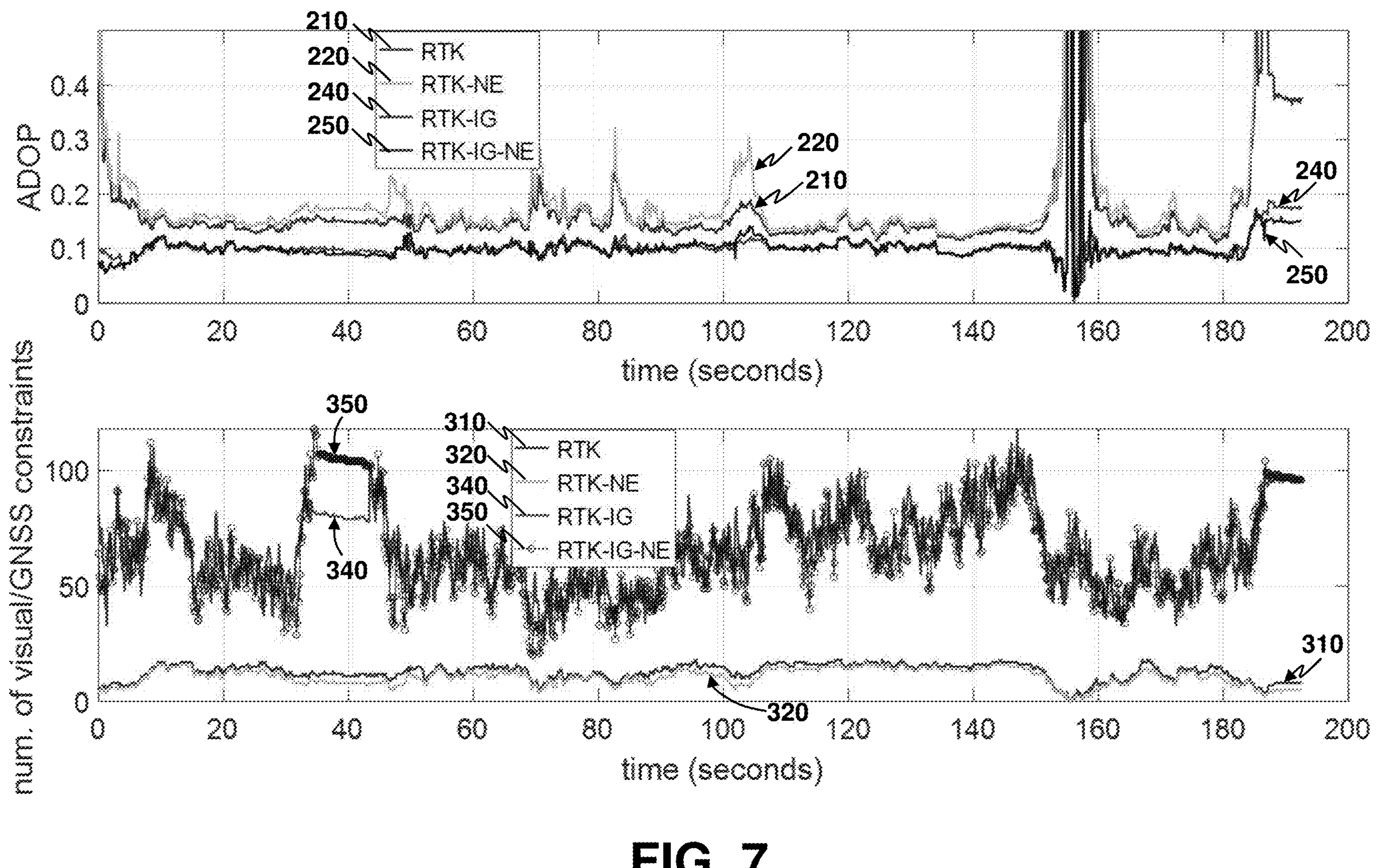
FIG. 7 is an illustration of the geometry analysis of the four methods, i.e. RTK, RTK-NE, RTK-IG, and RTK-NE-IG, in urban canyon 1, where the top panel of FIG. 7 denotes the ADOP during the experiment with the x-axis denoting time and the y-axis denoting the value of ADOP, and the bottom panel thereof denotes the number of constraints including the visual and GNSS measurements.

To deeply show the geometry improvement mainly caused by the visual measurements, we present the ADOP which is an effective indicator of the geometry distribution. FIG. 7 presents the geometry using the four methods, including the RTK, RTK-NE, RTK-IG, and RTK-NE-IG (the geometry of the RTK-NE-VINS is the same as the RTK-NE). The top panel of FIG. 7 presents the ADOP values for RTK 210, RTK-NE 220, RTK-IG 240 and RTK-NE-IG 250. It can be observed that the RTK-NE 220 has the largest ADOP due to the GNSS NLOS exclusion, compared with the conventional RTK 210. With the assistance of the visual measurements, the ADOP decreases dramatically to about 0.1. Interestingly, the ADOP of RTK-NE-IG 250 only increases slightly even with the GNSS NLOS exclusion, compared with the RTK-IG 240. This demonstrates that the visual measurements can effectively guarantee the geometry even when the GNSS NLOS exclusion is performed. Moreover, the ADOP value resulting from the RTK-NE-IG 250 is smaller than the RTK 210 even with the GNSS NLOS exclusion.

To show the number of constraints involved, the numbers of visual measurements and GNSS measurements for RTK 310, RTK-NE 320, RTK-IG 340 and RTK-NE-IG 350 are presented, as shown in the bottom panel of FIG. 7. The total number of GPS/BeiDou satellites is below 20 throughout the experiment. Fortunately, the number of visual measurements exceeds 40 at the majority of epochs. It shall be noted that the number of visual measurements is counted if it is tracked at the latest epoch. The statistic number of constraints contributed by visual and GNSS are listed in Table 3. Overall, a mean number of 12 satellites are received during the experiment. After the GNSS NLOS exclusion, the mean number decreases to 10. The mean number of visual constraints is about 53 during the experiment in urban canyon 1, with a total number of more than 60 by combining both the visual and GNSS measurements.

TABLE 3

Comparison of geometry constraint using four methods.

| Num. Constraints | RTK | RTK-NE | RTK-IG | RTK-NE-IG |
|---|---|---|---|---|
| Visual | 0 | 0 | 53.92 | 55.16 |
| GNSS | 12.64 | 10.59 | 12.64 | 10.59 |
| Total | 12.64 | 10.59 | 66.56 | 65.75 |

Figure 8:
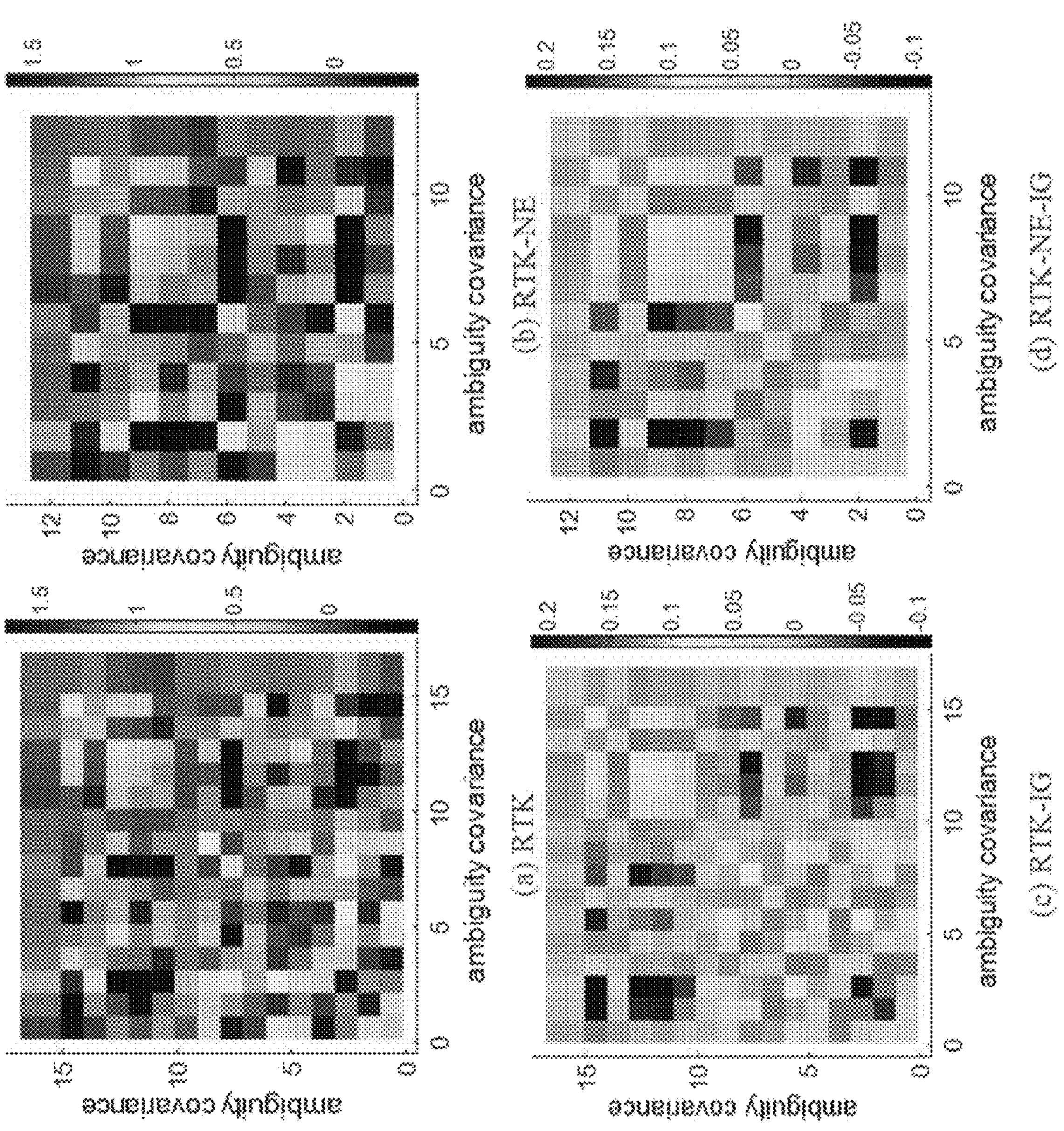
FIG. 8 is an illustration of the covariance matrix ($Q_{nn}$) of float ambiguities at a selected epoch for the four methods, (a) RTK, (b) RTK-NE, (c) RTK-IG, and (d) RTK-NE-IG, respectively.

To conduct an explicit comparison of the covariance matrix of the float ambiguity ($Q_{nn}$) that dominates the success rate of integer ambiguity resolution, each component of the matrix is visualized at an experimentally selected epoch, as shown in FIG. 8, corresponding to the four methods listed in Table 3. The top left figure presents the $Q_{nn}$ of RTK method, with some of the diagonal elements reaching 0.5 with 16 satellites in total. The deeper color denotes a larger value of the component in the matrix. After GNSS NLOS exclusion in the RTK-NE method (top right figure), the number of satellites decreases to 12 (the NLOS signals are 2, 3, 10, and 12th satellites). As a result, some of the diagonal components include deeper colors, which indicates larger uncertainty involved in the corresponding DD ambiguity, thus leading to a lower success rate of integer ambiguity resolution. After the visual measurements are applied, the values of the diagonal components of both RTK-IG and RTK-NE-IG are reduced to below 0.2.

In short, visual measurements can exert significant impacts on the improvement of geometry. However, it can also be found that the fixed rate of the proposed method (RTK-NE-IG) is still limited at 1.67%. Apart from the reason for unhandled multipath effects that have been elaborated previously, the poor GNSS measurement quality received by the employed low-cost commercial GNSS receiver (u-blox M8T) is another dominant factor, whose accuracy is far from the geodetic level GNSS receiver. Moreover, the visual measurements can also locally constraint the multiple epochs that cannot directly provide a globally referenced constraint. In other words, it is significant that at least several healthy and high-quality GNSS measurements are received to increase the fixed rate of GNSS-RTK positioning.

E.2.4. Analysis of System Initialization

The initialization of the extrinsic parameters between the ENU frame and local world frame is significant for the performance of the state estimation due to the high nonlinearity of the system, especially for the initialization of the yaw angle offset between both frames. To further verify the effectiveness of the proposed initialization method, where the Doppler and high accuracy DD carrier-phase measurements are applied, we compare the following two methods and the results are shown in Table 4:

(1) Weighted least squares (conventional)-based: Initialize $$T_{WL}^{WG}$$

only by aligning two sets of trajectories estimated and the one from VI-initialization in Section D.1.

(2) Doppler/Carrier Smoothing (proposed)-based: Initialize the $$T_{WL}^{WG}$$

only by solving formula (29), which is free of ambiguity resolution.

TABLE 4

Comparison of errors/time in the initialization of the extrinsic parameters between the ENU frame and the local world frame through different methods.

| Items | Weighted Least Squares-based | Doppler/Carrier Smoothing |
|---|---|---|
| Yaw (degree) | 15.70 | 5.93 |
| East (meter) | 1.05 | 0.92 |
| North (meter) | 0.86 | 0.80 |
| Up (meter) | 0.73 | 0.70 |
| Ave. Time (milliseconds) | 3097 | 4129 |

As shown in Table 4, an error of 15.70 degrees of the yaw offset is obtained through the conventional WLS-based method. With the assistance of the proposed method, the error of the yaw offset decreases to 5.93 degrees. This improved result mainly benefited from two factors, compared with the conventional WLS-based method. On the one hand, the proposed method makes use of multiple epoch DD carrier-phase measurements to estimate a set of positions that can significantly increase the smoothness compared with the traditional utilization of the DD carrier-phase. Meanwhile, the unknown integer ambiguity terms are eliminated via the left null space matrix. On the other hand, the velocity estimated from the Doppler measurement also contributes to the initialization of the yaw offset. The translation part $$(p_{WL}^{WG}) \text{ of } T_{WL}^{WG}$$

is also slightly improved with the assistance of the proposed method. Meanwhile, the time utilized for the whole initialization process is also slightly increased.

To successfully initialize the whole system, it is significant to provide a satisfactory initial guess of the $$T_{WL}^{WG}$$

to the estimator. However, if the robot starts from a highly dense urbanized area where both the carrier-phase and Doppler measurements are noisy, it is difficult to obtain a good initial guess of $$T_{WL}^{WG}$$

even though the proposed method. One possible solution is to apply the electronic compass to provide the yaw offset between the ENU and local world frames and refine $$T_{WL}^{WG}$$

when the robot gets into less urbanized areas.

E.3. Experimental Evaluation in Urban Canyon 2

Figure 9:
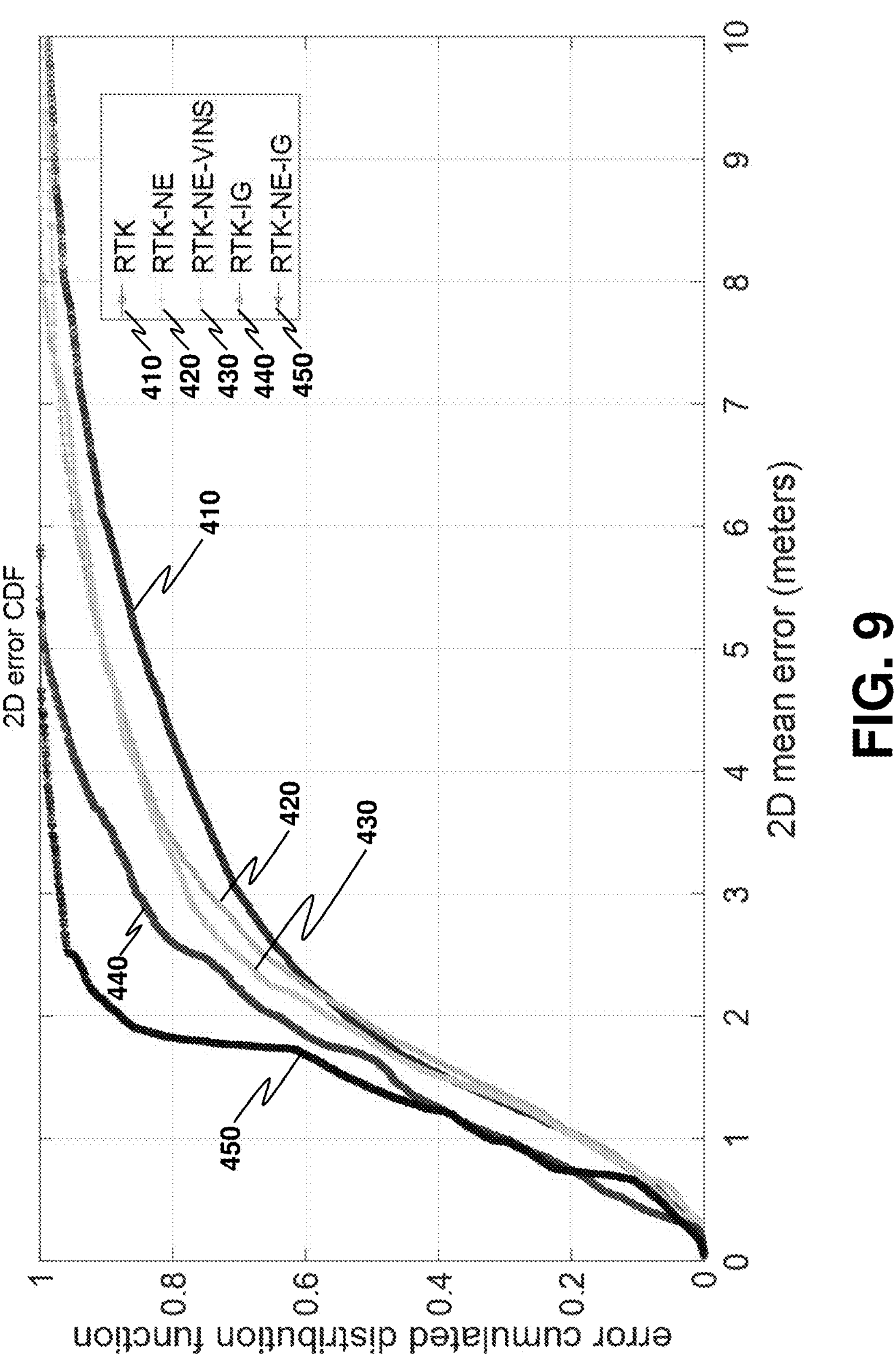
FIG. 9 is the cumulated distribution function for 2D positioning errors of the evaluated five methods in urban canyon 2.

To challenge the effectiveness of the proposed method, the proposed method is verified through the other dataset collected in a denser urban canyon scenario (refer to FIG. 5(*b*)). The positioning performance is shown in Table 5. The ECDFs for RTK 410, RTK-NE 420, RTK-NE-VINS 430, RTK-IG 440 and RTK-NE-IG 450 are shown in FIG. 9. A mean error of 2.68 meters is obtained through the conventional GNSS-RTK positioning method with a standard deviation of 2.23 meters. It can be found that the mean error is doubled due to the taller building structures in urban canyon 2, compared with the results in urban canyon 1. The 3D error reaches 9.94 meters, with a maximum error reaching 34.89 meters. After excluding the potential GNSS NLOS receptions, the improvement (11.56%) of the mean error is limited. Similar improvement is also obtained in 3D positioning. Moreover, the maximum errors decrease in both 2D and 3D positioning due to the exclusion of gross GNSS outlier measurements. However, a similar phenomenon to urban canyon 1 is also found in urban canyon 2, that the availability decreases from 99.05% to 71.5% due to the excessive GNSS NLOS exclusion.

The positioning accuracy is further improved after loosely integrating the GNSS positioning from the RTK-NE with the VINS, with improvements of 13.81% for 2D and 29.53% for 3D, respectively. Moreover, the availability is increased to 100% with the assistance of the pose estimation from VINS. Interestingly, the 2D maximum error increases from 8.73 meters (RTK-NE) to 12.24 meters. We look into the data and the scene, where the vehicle is stopping and waiting at an intersection. The pose estimation from the VINS drifts gradually due to the random walk of the IMU and the impact of the surrounding dynamic objects on the VINS. As a result, the RTK-NE-VINS drifts significantly in the road intersection. Fortunately, this problem is solved with the assistance of the tightly coupled integration of visual measurements using RTK-IG, with the maximum error decreasing to 5.50 for 2D positioning. More importantly, the 2D mean error decreases to 1.77 meters, with an improvement of 33.95%. However, an improvement of 60.51% is obtained for 3D positioning. Meanwhile, a fixed rate of 0.72% is obtained even in such an urbanized scenario and the availability is also guaranteed. The 2D mean error decreases to 1.37 meters, with an improvement of 48.90%. After applying the proposed RTK-NE-IG method which again shows the effectiveness of the proposed method. Meanwhile, the standard deviation decreases to 0.72 meters. Similar improvement is also obtained in the 3D positioning, with an improvement of 61.95%. Moreover, the fixed rate of GNSS-RTK increases to 5.19%, which further demonstrates the effectiveness of the proposed method in both excluding the GNSS NLOS receptions and improving the geometry constraint.

In short, the improvement is also obtained in the evaluated urban canyon 2, with a 2D mean error of 1.37 even in such an urbanized scenario. As discussed in the experimental validation in urban canyon 1, the unconsidered multipath effects are the major factor limiting the eventual positioning accuracy, even under the condition that the potential GNSS NLOS are excluded.

TABLE 5

Positioning performance of the evaluated five methods in urban canyon 2 (2D/3D: horizontal/3D positioning).

| All Data | RTK | RTK-NE | RTK-NE-VINS | RTK-IG | RTK-NE-IG |
|---|---|---|---|---|---|
| 2D MEAN | 2.68 | 2.37 | 2.31 | 1.77 | 1.37 |
| 2D STD | 2.23 | 1.69 | 1.86 | 1.15 | 0.72 |
| 2D Max | 11.38 | 8.73 | 12.24 | 5.50 | 5.83 |
| 2D Impr. | — | 11.56% | 13.81% | 33.95% | 48.90% |
| 3D MEAN | 6.94 | 5.70 | 4.89 | 2.74 | 2.64 |
| 3D STD | 7.32 | 3.99 | 2.83 | 0.96 | 1.24 |
| 3D Max | 34.89 | 30.68 | 14.56 | 5.88 | 6.89 |
| 3D Impr. | — | 11.57% | 29.53% | 60.51% | 61.95% |
| Fixed Rate | 0% | 0% | 0% | 0.72% | 5.19% |
| Avail. | 99.05% | 71.5% | 100% | 100% | 100% |

The improvement is calculated through the RTK method.

F. Details of Embodiments of Present Disclosure

Embodiments of the present disclosure are elaborated as follows based on the details, examples, applications, etc. as disclosed above.

An aspect of the present disclosure is to provide a method for estimating a position of a vehicle. The vehicle is configured to receive navigation signals of a GNSS. For instance, the vehicle is installed with a GNSS receiver for receiving the navigation signals of the GNSS. The vehicle may be an automobile driven by a person, an unmanned ground vehicle with autonomous driving, etc.

Figure 10:
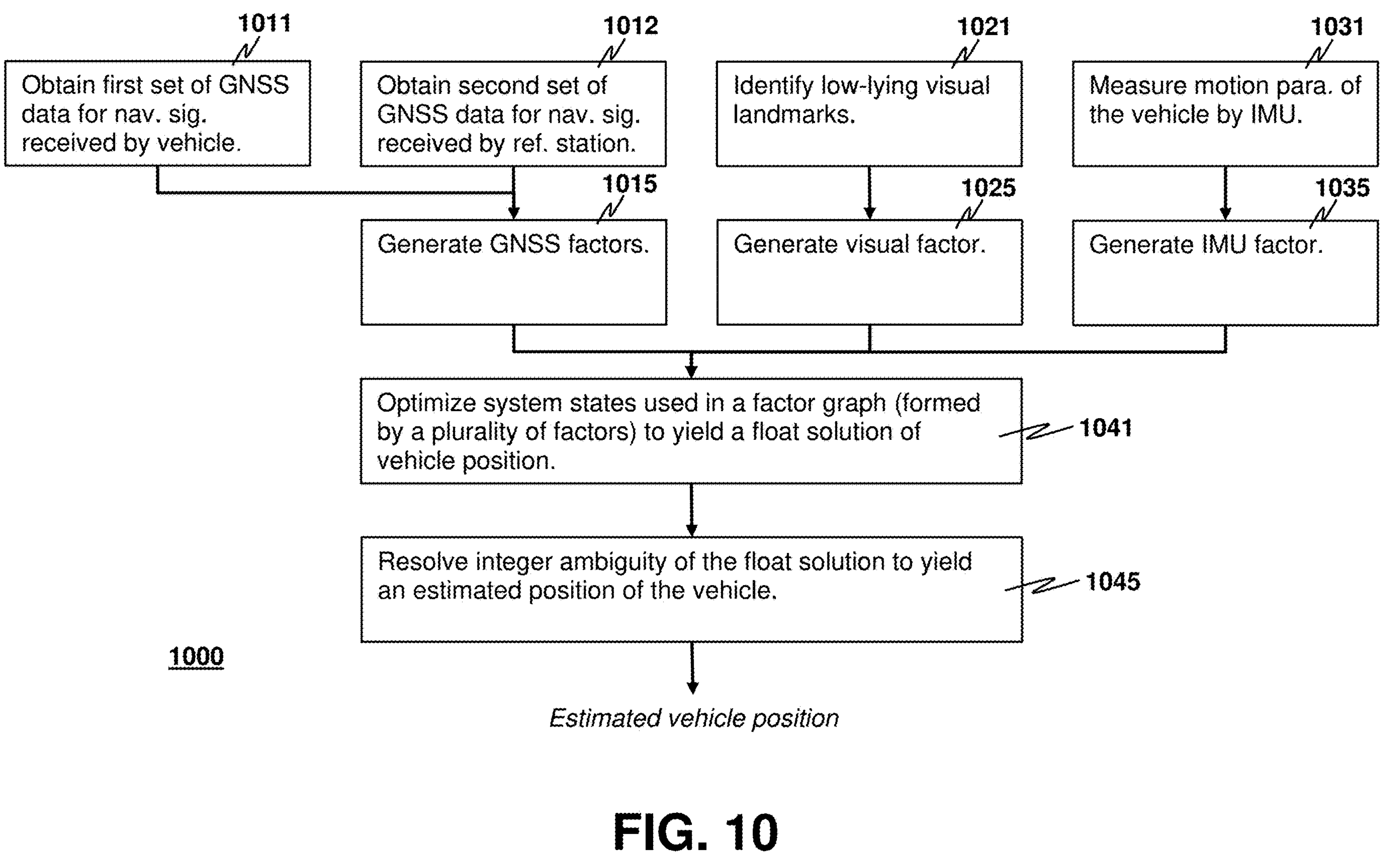
FIG. 10 depicts a flowchart showing exemplary steps of a method for estimating a position of a vehicle in accordance with an exemplary embodiment of the present disclosure.

FIG. 10 depicts a flowchart showing exemplary steps of the disclosed method (referenced as 1000). The method 1000 is implemented with GNSS measurements (as conducted in steps 1011 and 1012), visual measurement (as conducted in step 1021) and IMU measurement (as conducted in step 1031). Measurement data are processed to generate a plurality of factors used for forming a factor graph (as conducted in step 1015, 1025 and 1035). The position of the vehicle is estimated through optimizing the factor graph (as conducted in steps 1041 and 1045). Details of different steps are elaborated as follows.

In the step 1011, a first set of GNSS data derived from a first plurality of navigation signals is obtained, where the first plurality of navigation signals is received by the vehicle. The first set of GNSS data is used for positional measurement of the vehicle. In particular, the first plurality of navigation signals excludes any navigation signal identified to travel from the GNSS to the vehicle via a NLOS path. The exclusion of NLOS satellite measurements allows the first set of GNSS data to be obtained from healthy but high-elevation satellite measurements.

In the step 1012, a second set of GNSS data derived from a second plurality of navigation signals is obtained. In particular, the second plurality of navigation signals is received by a reference station for providing RTK positioning in vehicle-position estimation. Note that the vehicle is connectable to the reference station by a data communication link, which is preferably and typically a wireless communication link, in order that the vehicle is able to obtain the second set of GNSS data. The vehicle is implemented with a communication transceiver for communicating with the reference station.

After the first and second sets of GNSS data are obtained, a plurality of GNSS factors indicative of a contribution of GNSS measurement to vehicle-position estimation is generated in the step 1015 according to the first and second sets of GNSS data. To support GNSS-RTK positioning, preferably the plurality of GNSS factors includes a DD pseudorange factor, a DD carrier-phase factor and a GNSS Doppler factor. Computation details of the DD pseudorange factor, DD carrier-phase factor and GNSS Doppler factor may be found in Sections C.4.1, C.4.2 and C.5, respectively.

In the step 1021, a set of low-lying visual landmarks is identified from a first set of images. The first set of images captures low-lying environment structures visible to the vehicle for visually measuring a near-ground environment.

After the set of low-lying visual landmarks is identified in the step 1021, a visual factor indicative of a contribution of visual measurement to vehicle-position estimation is generated in the step 1025 according to the set of low-lying visual landmarks as identified. Computation details of the visual factor may be found in Section C.3.

In the step 1031, a set of motion parameters of the vehicle is measured by an IMU onboard the vehicle. Generally, the IMU is equipped with one or more inertial-measurement devices such as a gyroscope, an accelerometer, a magnetometer, etc.

An IMU factor indicative of a contribution of IMU measurement to vehicle-position estimation is generated in the step 1035 according to the set of motion parameters.

In the step 1041, a plurality of system states used in a factor graph is optimized for integrating measurement data obtained in plural measurements. As a result, the optimized system states give a float solution of the vehicle position. In the step 1041, the factor graph is formed by a plurality of factors. An individual factor is indicative of a contribution of a certain measurement to vehicle-position estimation. In certain embodiments, the system states may be optimized according to formula (22) by a numerical technique.

The float solution of the vehicle position as obtained in the step 1041 contains integer ambiguity. In the step 1045, integer ambiguity of the float solution is resolved, thereby yielding an estimated position of the vehicle.

Advantageously, the plurality of factors as used in the step 1041 includes the visual factor and the plurality of GNSS factors. As a result of integrating the visual factor and the plurality of GNSS factors in the FGO, complementariness between the set of low-lying visual landmarks and the first plurality of navigation signals are utilized for improving geometry constraints in vehicle-position estimation to enhance estimation accuracy. The plurality of factors further includes the IMT factor.

Other implementation details of the disclosed method 1000 are elaborated as follows.

Figure 11:
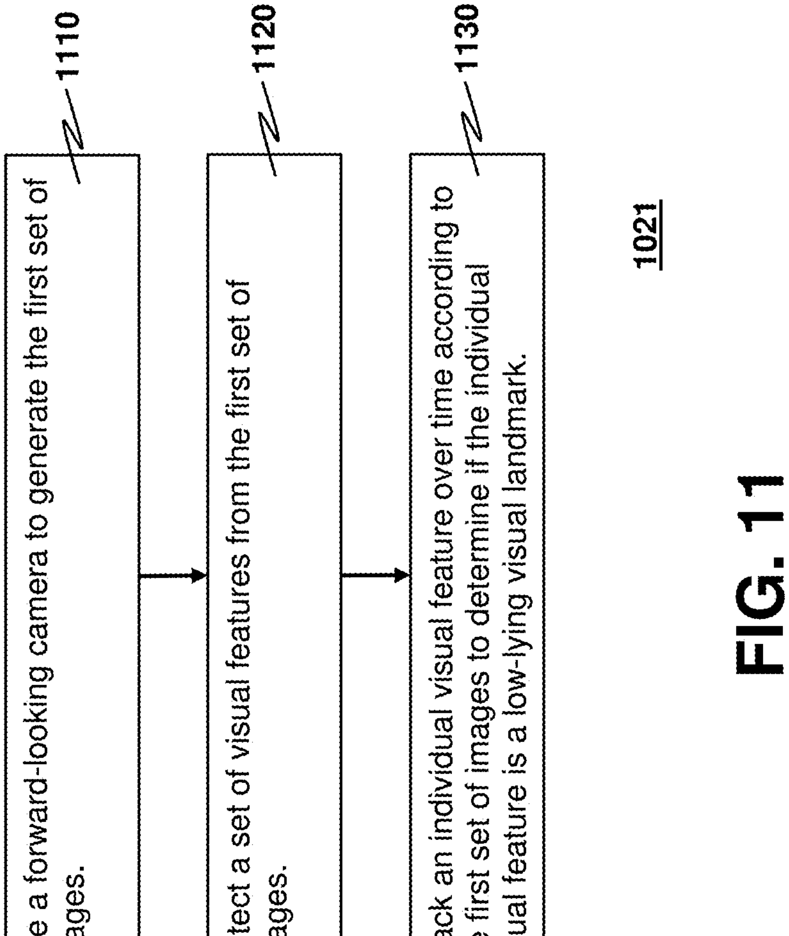
FIG. 11 depicts a flowchart showing preferable steps used in identifying a set of low-lying visual landmarks from a first set of images captured by a forward-looking camera as involved in the disclosed method.

FIG. 11 depicts a flowchart showing preferable steps used in performing the step 1021 of identifying the set of low-lying visual landmarks from the first set of images. Preferably, the step 1021 comprises steps 1120 and 1130.

In the step 1120, a set of visual features is detected or extracted from the first set of images. An image-processing algorithm on feature extraction may be used to implement the step 1120. In certain embodiments, the first set of images is obtained by using a forward-looking camera onboard the vehicle to capture views of the environment visible by the camera (step 1110).

After the set of visual features is obtained, an individual visual feature is tracked over time in the step 1130 according to the first set of images to determine whether the individual visual feature is a low-lying visual landmark. As a result, it allows the set of low-lying visual landmarks to be identified. Generally, the first set of images is taken at a sequence of time instants so that the first set of images is a time sequence of images. By analyzing a trajectory of the individual visual feature over time, the individual visual feature may be determined to be a low-lying visual landmark if the individual visual feature is found to be spatially stationary with a low elevation angle with respect to the ground.

Figure 12:
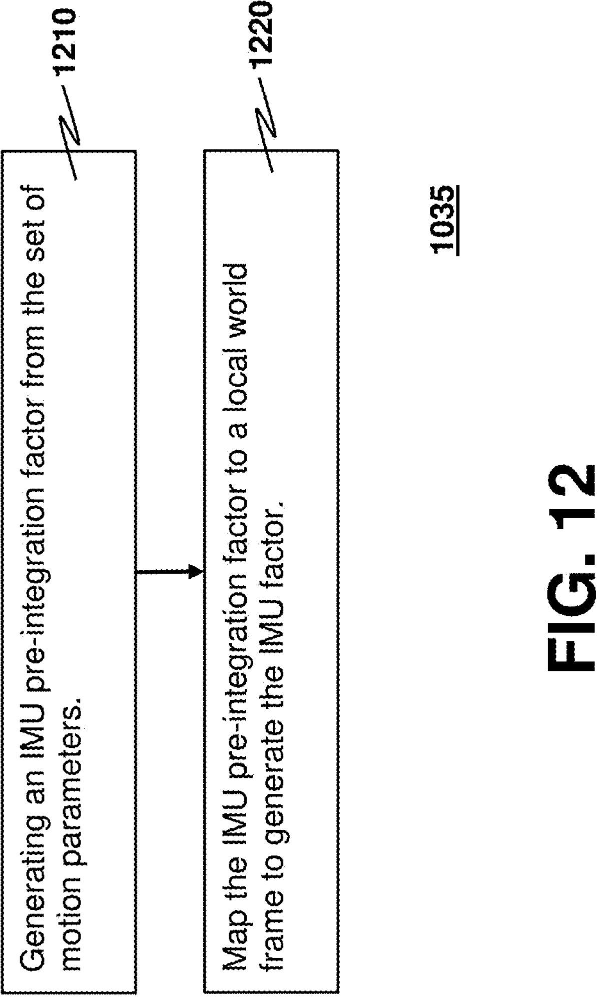
FIG. 12 depicts a flowchart showing preferable steps used in generating an IMU factor according to a set of motion parameters as involved in the disclosed method.

FIG. 12 depicts a flowchart showing preferable steps used in performing the step 1035 of generating the IMU factor according to the set of motion parameters. Preferably, the step 1035 comprises steps 1210 and 1220. In the step 1210, an IMU pre-integration factor is first generated from the set of motion parameters. Computation details of the IMU pre-integration factor may be found in Section C.2. The IMU pre-integration factor is then mapped to a local world frame in the step 1220 to thereby generate the IMU factor. The local world frame is a reference frame of a VI system in the vehicle.

Figure 13:
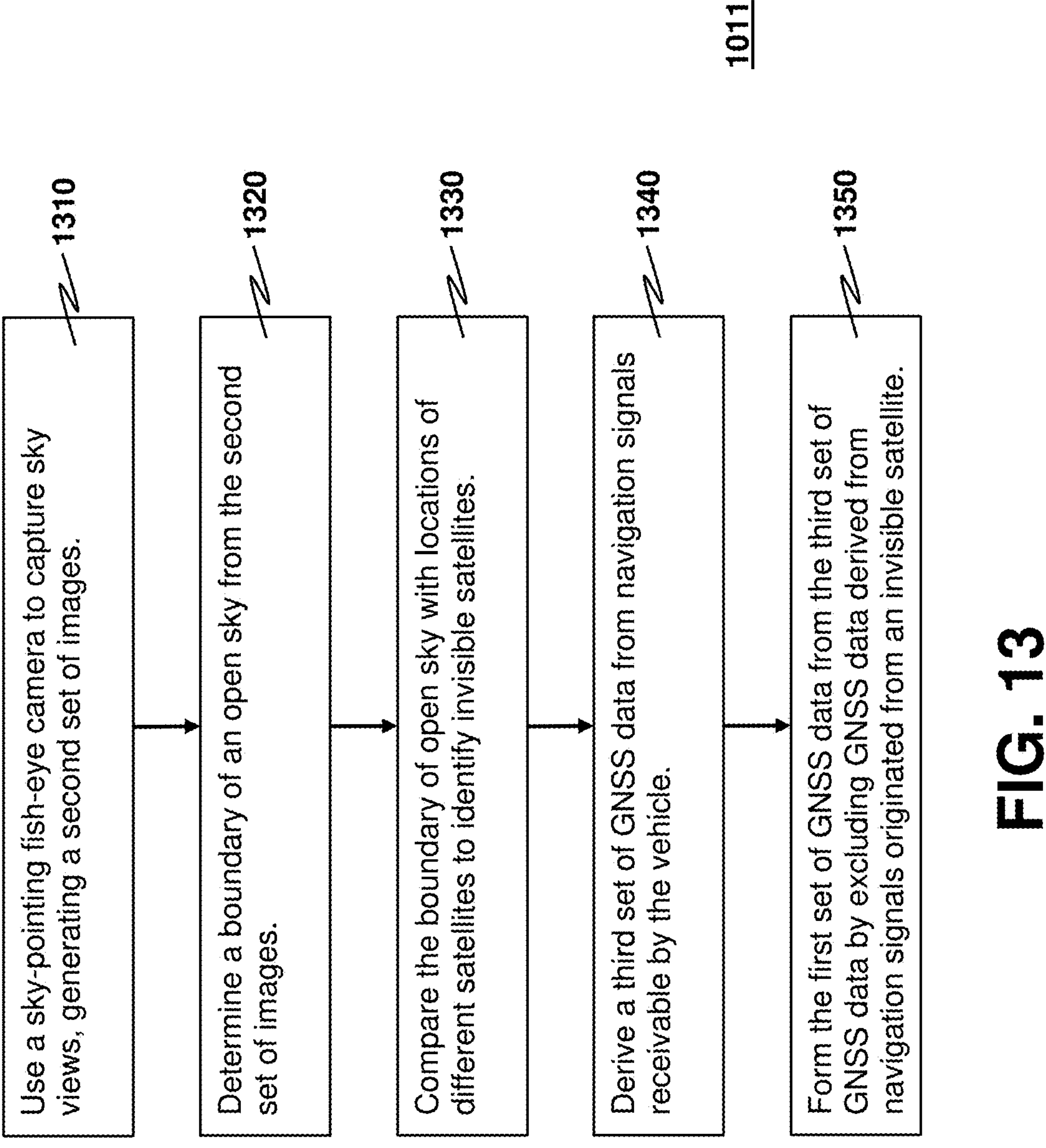
FIG. 13 depicts a flowchart showing steps used in obtaining a first set of GNSS data as involved in the disclosed method.

FIG. 13 depicts a flowchart showing steps used in performing the step 1011 of obtaining the first set of GNSS data in accordance with certain embodiments of the present disclosure. The step 1011 comprises steps 1310, 1320, 1330, 1340 and 1350.

In the step 1310, a sky-pointing fish-eye camera onboard the vehicle is used to generate a second set of images that capture sky views. A boundary of an open sky above the vehicle is then determined from the second set of images in the step 1320. In the step 1330, the boundary of the open sky is compared with locations of different satellites in the GNSS to identify a plurality of satellites invisible to the vehicle. Afterwards, in the step 1340, a third set of GNSS data is derived from a third plurality of navigation signals receivable by the vehicle from the GNSS. The first set of GNSS data is then formed from the third set of GNSS data in the step 1350 by excluding GNSS data derived from any navigation signal originated from an invisible satellite identified in the plurality of invisible satellites.

In certain embodiments, the boundary of the open sky above the vehicle is determined in the step 1320 by using a DNN to perform image segmentation and classification on the second set of images. The DNN may be a U-net.

In certain embodiments, the plurality of system states involved in estimating the float solution in the step 1041 includes: position, orientation and velocity of the IMU; biases of gyroscope and accelerometer in the IMU; an inverse depth of an individual visual landmark; a receiver clock bias drift rate; and extrinsic parameters between a global frame used by the GNSS, and a local world frame used by a VI system in the vehicle.

Preferably, the optimizing of the plurality of system states in the step 1041 is started with generating initial guesses for respective system states. The generation of the initial guesses for respective system states includes generating initial guesses for VI-related system states and generating initial guesses for GNSS-related system states.

The VI-related system states may include: position, orientation and velocity of the IMU; biases of gyroscope and accelerometer in the IMU; and an inverse depth of an individual visual landmark. The GNSS-related system states may include: a receiver clock bias drift rate; and extrinsic parameters between a global frame used by the GNSS, and a local world frame used by a visual/inertial system in the vehicle.

In generating the initial guesses for the respective system states in the step 1041, it is preferable that in the plurality of system states, initial guesses of velocity set and position set inside a sliding window are estimated simultaneously based on data of Doppler measurement, DD pseudorange measurement and DD carrier-phase measurement as computed from the first and second sets of GNSS data. The advantage in carrying out optimization of the plurality of system states in the step 1041 is explained Section D.2.

The present disclosure may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

REFERENCES

There follows a list of references that are occasionally cited in the specification. Each of the disclosures of these references is incorporated by reference herein in its entirety.

[1] T. Qin, P. Li, and S. Shen, "Vins-mono: A robust and versatile monocular visual-inertial state estimator," *IEEE Transactions on Robotics*, vol. 34, no. 4, pp. 1004-1020, 2018.

[2] X. Bai, W. Wen, and L.-T. Hsu, "Using sky-pointing fish-eye camera and LiDAR to aid GNSS single-point positioning in urban canyons," *IET Intelligent Transport Systems*, vol. 14, no. 8, pp. 908-914, 2020.

What is claimed is:

1. A method for estimating a position of a vehicle, the vehicle being configured to receive navigation signals of a global navigation satellite system (GNSS), the method comprising:

obtaining a first set of GNSS data derived from a first plurality of navigation signals received by the vehicle for positional measurement, wherein the first plurality of navigation signals excludes any navigation signal identified to travel from the GNSS to the vehicle via a non-line-of-sight (NLOS) path, allowing the first set of GNSS data to be obtained from healthy but high-elevation satellite measurements;

obtaining a second set of GNSS data derived from a second plurality of navigation signals received by a reference station for providing real-time kinematic (RTK) positioning in vehicle-position estimation;

generating a plurality of GNSS factors indicative of a contribution of GNSS measurement to vehicle-position estimation according to the first and second sets of GNSS data;

identifying a set of low-lying visual landmarks from a first set of images that capture low-lying environment structures visible to the vehicle for visually measuring a near-ground environment;

generating a visual factor indicative of a contribution of visual measurement to vehicle-position estimation according to the set of low-lying visual landmarks;

optimizing a plurality of system states used in a factor graph for integrating measurement data obtained in plural measurements to yield a float solution of the vehicle position, the factor graph being formed by a plurality of factors, an individual factor being indicative of a contribution of a measurement to vehicle-position estimation, wherein the plurality of factors includes the visual factor and the plurality of GNSS factors, thereby utilizing complementariness between the set of low-lying visual landmarks and the first plurality of navigation signals for improving geometry constraints in vehicle-position estimation to enhance estimation accuracy; and resolving integer ambiguity of the float solution to yield an estimated position of the vehicle.

2. The method of claim 1, wherein the identifying of the set of low-lying visual landmarks comprises:

detecting a set of visual features from the first set of images; and tracking an individual visual feature over time according to the first set of images to determine whether the individual visual feature is a low-lying visual landmark, thereby allowing the set of low-lying visual landmarks to be identified.

3. The method of claim 2, wherein the identifying of the set of low-lying visual landmarks further comprises using a forward-looking camera onboard the vehicle to generate the first set of images.

4. The method of claim 1 further comprising:

measuring a set of motion parameters of the vehicle by an inertial measurement unit (IMU) onboard the vehicle; and generating an IMU factor indicative of a contribution of IMU measurement to vehicle-position estimation according to the set of motion parameters;

wherein in integrating the measurement data obtained in the plural measurements, the plurality of factors further includes the IMU factor.

5. The method of claim 4, wherein the generating of the IMU factor comprises:

generating an IMU pre-integration factor from the set of motion parameters; and mapping the IMU pre-integration factor to a local world frame to thereby generate the IMU factor, wherein the local world frame is a reference frame of a visual/inertial system in the vehicle.

6. The method of claim 4, wherein the optimizing of the plurality of system states comprises generating initial guesses for respective system states.

7. The method of claim 6, wherein the generating of the initial guesses for the respective system states includes:

a visual/inertial (VI) initialization step of generating initial guesses for VI-related system states; and a GNSS-VI initialization step of generating initial guesses for GNSS-related system states;

wherein in the plurality of system states, initial guesses of velocity set and position set inside a sliding window are estimated simultaneously based on data of Doppler measurement, DD pseudorange measurement and DD carrier-phase measurement as computed from the first and second sets of GNSS data.

8. The method of claim 4, wherein the plurality of system states includes:

position, orientation and velocity of the IMU;

biases of gyroscope and accelerometer in the IMU;

an inverse depth of an individual visual landmark;

a receiver clock bias drift rate; and extrinsic parameters between a global frame used by the GNSS, and a local world frame used by a visual/inertial system in the vehicle.

9. The method of claim 8, wherein the optimizing of the plurality of system states comprises generating initial guesses for respective system states.

10. The method of claim 9, wherein the generating of the initial guesses for the respective system states includes:

a visual/inertial (VI) initialization step of generating initial guesses for VI-related system states; and a GNSS-VI initialization step of generating initial guesses for GNSS-related system states;

wherein in the plurality of system states, initial guesses of velocity set and position set inside a sliding window are estimated simultaneously based on data of Doppler measurement, DD pseudorange measurement and DD carrier-phase measurement as computed from the first and second sets of GNSS data.

11. The method of claim 10, wherein:

the VI-related system states include:

position, orientation and velocity of the IMU;

biases of gyroscope and accelerometer in the IMU; and an inverse depth of an individual visual landmark;

the GNSS-related system states include:

a receiver clock bias drift rate; and extrinsic parameters between a global frame used by the GNSS, and a local world frame used by a visual/inertial system in the vehicle.

12. The method of claim 1, wherein the plurality of GNSS factors includes a double-differenced (DD) pseudorange factor, a DD carrier-phase factor, and a GNSS Doppler factor.

13. The method of claim 1, wherein the obtaining of the first set of GNSS data comprises:

using a sky-pointing fish-eye camera onboard the vehicle to generate a second set of images that capture sky views;

determining a boundary of an open sky above the vehicle from the second set of images;

comparing the boundary of the open sky with locations of different satellites in the GNSS to identify a plurality of satellites invisible to the vehicle;

deriving a third set of GNSS data from a third plurality of navigation signals receivable by the vehicle; and forming the first set of GNSS data from the third set of GNSS data by excluding GNSS data derived from any navigation signal originated from an invisible satellite identified in the plurality of invisible satellites.

14. The method of claim 13, wherein the boundary of the open sky above the vehicle is determined by using a deep neural network (DNN) to perform image segmentation and classification on the second set of images.

15. The method of claim 14, wherein the DNN is a U-net.

* * * * *